(12) United States Patent
Langhammer et al.

(10) Patent No.: US 10,942,706 B2
(45) Date of Patent: Mar. 9, 2021

(54) IMPLEMENTATION OF FLOATING-POINT TRIGONOMETRIC FUNCTIONS IN AN INTEGRATED CIRCUIT DEVICE

(71) Applicant: Intel Corporation, Santa Clara, CA (US)

(72) Inventors: Martin Langhammer, Salisbury (GB); Bogdan Pasca, Chesham (GB)

(73) Assignee: Intel Corporation, Santa Clara, CA (US)

( * ) Notice: Subject to any disclaimer, the term of this patent is extended or adjusted under 35 U.S.C. 154(b) by 592 days.

(21) Appl. No.: 15/633,792

(22) Filed: Jun. 27, 2017

(65) Prior Publication Data

US 2018/0321910 A1 Nov. 8, 2018

Related U.S. Application Data

(60) Provisional application No. 62/502,127, filed on May 5, 2017.

(51) Int. Cl.
*G06F 7/483* (2006.01)
*G06F 7/548* (2006.01)
(Continued)

(52) U.S. Cl.
CPC .............. *G06F 7/499* (2013.01); *G06F 5/012* (2013.01); *G06F 7/483* (2013.01); *G06F 7/50* (2013.01);
(Continued)

(58) Field of Classification Search
CPC .................................. G06F 7/483; G06F 7/548
See application file for complete search history.

(56) References Cited

U.S. PATENT DOCUMENTS 3,473,160 A 10/1969 Wahlstrom
3,896,299 A 7/1975 Rhodes
(Continued)

FOREIGN PATENT DOCUMENTS

EP 0158430 10/1985
EP 0380456 8/1990
(Continued)

OTHER PUBLICATIONS

Gaffar, A.A. et al., "Floating-Point Bitwidth Analysis via Automatic Differentiation," IEEE Conference on Field Programmable Technology, Hong Kong, Dec. 2002.
(Continued)

*Primary Examiner* — Chuong D Ngo
(74) *Attorney, Agent, or Firm* — Fletcher Yoder, P.C.

(57) ABSTRACT

The present embodiments relate to integrated circuits with circuitry that implements floating-point trigonometric functions. The circuitry may include an approximation circuit that generates an approximation of the output of the trigonometric functions, a storage circuit that stores predetermined output values of the trigonometric functions, and a selector circuit that selects between different possible output values based on a control signal from a control circuit. In some embodiments, the circuitry may include a mapping circuit and a restoration circuit. The mapping circuit may map an input value from an original quadrant of the trigonometric circle to a predetermined input interval, and the restoration circuit may map the output value selected by the selection circuit back to the original quadrant of the trigonometric circle. If desired, the circuitry may be implemented in specialized processing blocks.

20 Claims, 12 Drawing Sheets

(51) Int. Cl.
  *G06F 7/499* (2006.01)
  *G06F 5/01* (2006.01)
  *G06F 7/50* (2006.01)
  *G06F 7/523* (2006.01)

(52) U.S. Cl.
  CPC .............. *G06F 7/523* (2013.01); *G06F 7/548* (2013.01); *G06F 2101/04* (2013.01)

(56) References Cited

U.S. PATENT DOCUMENTS

| | | |
|---|---|---|
| 4,077,063 A | 2/1978 | Lind |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Bennet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |

(56) References Cited

U.S. PATENT DOCUMENTS

| | | |
|---|---|---|
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,385,632 B1 | 5/2002 | Choe et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,801,925 B2 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,930,335 B2 | 4/2011 | Gura |
| 7,930,336 B2 | 4/2011 | Langhammer |
| 8,589,463 B2 | 11/2013 | Langhammer |
| 8,812,573 B2 | 8/2014 | Langhammer |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |

(56) References Cited

U.S. PATENT DOCUMENTS

| | | |
|---|---|---|
| 2002/0078114 A1 | 6/2002 | Wang et al. |
| 2002/0089348 A1 | 7/2002 | Langhammer |
| 2002/0116434 A1 | 8/2002 | Nancekievill |
| 2002/0129073 A1 | 9/2002 | Page et al. |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2006/0059215 A1 | 3/2006 | Maharatna et al. |
| 2007/0083585 A1 | 4/2007 | St. Denis et al. |
| 2007/0124352 A1 | 5/2007 | Wittig |
| 2007/0185951 A1 | 8/2007 | Lee et al. |
| 2007/0185952 A1 | 8/2007 | Langhammer et al. |
| 2008/0133627 A1 | 6/2008 | Langhammer et al. |
| 2008/0183783 A1 | 7/2008 | Tubbs |
| 2009/0172052 A1 | 7/2009 | DeLaquil et al. |
| 2009/0187615 A1 | 7/2009 | Abe et al. |
| 2009/0300088 A1 | 12/2009 | Michaels |
| 2010/0098189 A1 | 4/2010 | Oketani |
| 2012/0054256 A1 | 3/2012 | Langhammer |

FOREIGN PATENT DOCUMENTS

| | | |
|---|---|---|
| EP | 0411491 | 2/1991 |
| EP | 0461798 | 12/1991 |
| EP | 0498066 | 8/1992 |
| EP | 0555092 | 8/1993 |
| EP | 0606653 | 7/1994 |
| EP | 0632369 | 1/1995 |
| EP | 0657803 | 6/1995 |
| EP | 0660227 | 6/1995 |
| EP | 0668659 | 8/1995 |
| EP | 0721159 | 7/1996 |
| EP | 0905906 | 3/1999 |
| EP | 0909028 | 4/1999 |
| EP | 0927393 | 7/1999 |
| EP | 0992885 | 4/2000 |
| EP | 1031934 | 8/2000 |
| EP | 1058185 | 12/2000 |
| EP | 1220108 | 7/2002 |
| GB | 2283602 | 5/1995 |
| GB | 2286737 | 8/1995 |
| GB | 2318198 | 4/1998 |
| JP | 61-237133 | 10/1986 |
| JP | 63-218131 | 8/1988 |
| JP | 4-332036 | 11/1992 |
| JP | 5-134851 | 6/1993 |
| JP | 6-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO2005/066832 | 7/2005 |
| WO | WO2005/101190 | 10/2005 |
| WO | WO2006/083940 | 8/2006 |

OTHER PUBLICATIONS

Hauck, S., "The Future of Reconfigurable Systems," Keynote Address, 5th Canadian Conference on Field Programmable Devices, Jun. 1998,http://www.ee.washington.edu/people/faculty/hauck/publications/ReconfigFuture.PDF.

Heysters, P.M., et al., "Mapping of DSP algorithms on field programmable function arrays," Field-Programmable Logic and Applications. Roadmap to Reconfigurable Computing. 10th International Conference, FPL 2000. Proceedings (Lecture Notes in Computer Science vol. 1896), Aug. 27-30, 2000, pp. 400-411.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," Field Programmable Logic and Applications, 9th International Workshop, FPL'99, Proceedings (Lecture Notes in Computer Science vol. 1673), Lysaght, P., et al., eds., Aug. 30-Sep. 1, 1999, pp. 264-273.

Underwood, K. "FPGAs vs. CPUs: Trends in Peak Floating-Point Performance," Proceedings of the 2004 ACM/SIGDA 12th International Symposium on Field Programmable Gate Arrays, pp. 171-80, Feb. 22-24, 2004.

Communication Pursuant to Article 94(3) EPC for EP Application No. 18168632.0 dated Sep. 10, 2019, 7 pages.

Steven W Smith ED—Smith S W: "Digital Signal Processing: A Practical Guide for Engineers and Scientists, Chapter 28 (Digital Signal Processors)", Jan. 1, 2003 (Jan. 1, 2003), ISBN: 978-0-7506-7444-7, 32 pages.

Chris Heckler: "Let's Get to the (Floating) Point", Game Developer, Mar. 1, 1996 (Mar. 1, 1996), 6 pages.

Walters, A.L., "A Scaleable FIR Filter Implementation Using 32-bit Floating-Point Complex Arithmetic on, a FPGA Based Custom Computing Platform," Allison L. Walters, Thesis Submitted to the Faculty of Virginia Polytechnic Institute and State University, Jan. 30, 1998.

Xilinx Inc., "XtremeDSP Design Considerations User Guide," v1.2, Feb. 4, 2005.

Govindu, G. et al., "Analysis of High-performance Floating-point Arithmetic on FPGAs," Proceedings of the 18th International Parallel and Distributed Processing Symposium (PDPS'04), pp. 149-156, Apr. 2004.

"Virtex-II 1.5V Field-Programmable Gate Arrays", XILINX, Jan. 25, 2001, module 2 of 4.

"Virtex-II 1.5V Field-Programmable Gate Arrays", XILINX, Apr. 2, 2001, module 1 of 4.

"Virtex-II 1.5V Field-Programmable Gate Arrays", XILINX, Apr. 2, 2001, module 2 of 4.

Shang, Y., "Implementation of IP Core of Fast Sine and Cosine Operation through FPGA," 2012 International Conference on Future Energy, Environment, and Materials, Energy Procedia, vol. 16, 2012, pp. 1253-1258.

Garcia, E., et al., "Pipelined CORDIC Design on FPGA for a Digital Sine and Cosine Waves Generator," 2006 3rd international Conference on Electrical and Electronics Engineering, Sep. 2006, pp. 1-4.

Berkeley Design Technology, Inc., "An Independent Analysis of Floating-point DSP Design Flow and Performance on Altera 28-nm FPGAs," Oct. 2011, downloaded from http://www.bdti.com/MyBDTI/pubs/2012 Altera FloatingPoint Design.pdf.

Pasca, B., "Correctly Rounded Floating-Point Division for DSP-enabled FPGAs," international Conference on Field Programmable Logic and Applications, Aug. 2012, pp. 249-254.

(56) References Cited

OTHER PUBLICATIONS

De Dinechin, F., et al., "Designing Custom Arithmetic Data Paths with FloPoCo," IEEE Design and Test of Computers, vol. 28(4), Jul.-Aug. 2011, pp. 18-27.

Langhammer, M., et al., "FPGA Floating Point Datapath Compiler," 17th Annual IEEE Symposium on Field-Programmable Custom Computing Machines, Apr. 2009, pp. 259-262.

Langhammer, M., et al., "Faithful Single-Precision Floating-Point Tangent for FPGAs," ACM/SIGDA International Symposium on Field Programmable Gate Arrays, Feb. 2013, pp. 39-42.

Detrey, J., et al., "Floating-Point Trigonometric Functions for FPGAs," International Conference on Field Programmable Logic and Applications, Aug. 2007, pp. 29-34.

Payne, M. H., et al., "Radian Reduction for Trigonometric Functions," ACM SIGNUM Newsletter, vol. 18(1), Jan. 1983, pp. 19-24.

Intel Corporation, "DSP Builder Advanced Blockset," May 2017, downloaded from https://www.altera.com/products/design-software/model---simulation/dsp-builder/overview.html.

Extended EP Search Report for EP Application No. 18168632 dated Sep. 27, 2018; 8 Pages.

Altera Corporation, "Stratix II Device Handbook, Chapter 6—DSP Blocks in Stratix II Devices," v1.1, Jul. 2004.

Altera Corporation, "Digital Signal Processing (DSP)," Stratix Device Handbook, vol. 2, Chapter 6 and Chapter 1, v1.1 (Sep. 2004).

Andrejas, J., et al., "Reusable DSP functions in FPGAs," Field-Programmable Logic and Applications. Roadmap to Reconfigurable Computing. 10th International Conference, FPL 2000.

Aoki, T., "Signed-weight arithmetic and its application to a field-programmable digital filter architecture," IEICE Transactions on Electronics, 1999, vol. E82C, No. 9, Sep. 1999.

Weisstein, E.W., "Karatsuba Multiplication," MathWorld-A Wolfram Web Resource (Dec. 9, 2007), accessed at http://malhworld.wolfram.com/KaratsubaMultiplicalion_html.

"Xilinx Unveils New FPGA Architecture to Enable High-Performance, 10 Million System Gate Designs", Xilinx, Jun. 22, 2020.

Xilinx Inc., "Virtex-11 1.5V Field-Programmable Gate Arrays", Advance Product Specification, DS031-2 (v1.9), Nov. 29, 2001.

Xilinx Inc., "A 1D Systolic FIR," copyright 1994-2002, downloaded from http://www.iro.umonlreal.ca/-aboulham/r6221 /Xilinx%20A %201 D%20systolic%20FIRhim.

Xilinx Inc., "Complex Multiplier v2.0", DS291 Product Specification/Datasheet, Nov. 2004.

Haynes, S.D., et al., "Configurable multiplier blocks for embedding in FPGAs," Electronics Letters, vol. 34, No. 7, pp. 638-39 (Apr. 2, 1998).

Altera Corporation, "FIR Compiler: MegaCore® Function User Guide," version 3.3.0, rev. 1, pp. 311 through 315 (Oct. 2005).

Ashour, Ma, et al., "An FPGA implementation guide for some different types of serial-parallel multiplier structures," Microelectronics Journal, vol. 31, No. 3, 2000.

IMPLEMENTATION OF FLOATING-POINT TRIGONOMETRIC FUNCTIONS IN AN INTEGRATED CIRCUIT DEVICE

TECHNICAL FIELD

The present embodiments relate to integrated circuits and, more particularly, to the implementation of floating-point trigonometric functions in an integrated circuit device.

BACKGROUND

As applications increase in complexity, it has become more common to include specialized arithmetic circuitry that is sometimes arranged in specialized processing blocks in integrated circuits. Such specialized processing blocks may be partly or fully hardwired to perform one or more specific tasks, such as a logical or a mathematical operation. A specialized processing block may also contain one or more specialized structures, such as an array of configurable memory elements.

Examples of structures that are commonly implemented in such specialized processing blocks include: multipliers, adders, accumulators, arithmetic logic units (ALUs), barrel-shifters, various memory elements or storage circuits such as first-in first-out (FIFO) circuits, last-in first-out (LIFO) circuits, serial-in parallel-out (SIPO) shift register circuits, parallel-in serial-out (PISO) shift register circuits, random-access memory (RAM) circuits, read-only memory (ROM) circuits, content-addressable memory (CAM) circuits and register files, logic AND, logic NAND, logic OR, logic NOR arrays, etc., or combinations thereof.

One particularly useful type of specialized processing block, which is sometimes also referred to as a digital signal processing (DSP) block, may be used to process digital signals such as video signals, audio signals, etc. Such blocks are frequently also referred to as multiply-accumulate (MAC) blocks, because they include structures to perform multiplication operations, and sums and/or accumulations of multiplication operations.

Integrated circuits such as programmable integrated circuits often include specialized processing blocks. Each of those specialized processing blocks includes multipliers, adders, and registers, as well as programmable connectors (e.g., multiplexers) that allow the various components of the block to be configured in different ways.

Until recently, the arithmetic operators (adders and multipliers) in such specialized processing blocks have been exclusively fixed-point operators. Recently, circuitry has been introduced into specialized processing blocks that implements floating-point arithmetic operations, sometimes combined with general-purpose programmable logic outside the specialized processing block.

Many scientific applications make use of the trigonometric functions sine (sin), cosine (cos), and tangent (tan) and their reciprocal functions cosecant (csc), secant (sec), and cotangent (cot). Trigonometric functions are generally defined for the relatively small angular range of 0-360 degree, or 0-2π radians. For angular values above 2π, the values of the trigonometric functions repeat. The tangent is particular in that it repeats the function from the interval]−π/2; π/2[ left and right of that interval. Trigonometric functions often require the use of floating-point numbers. Floating-point trigonometric functions are part of the math.h programming library and are available in all mainstream programming languages.

DETAILED DESCRIPTION

The present embodiments provided herein relate to integrated circuits and, more particularly, to the implementation of floating-point trigonometric functions in an integrated circuit device.

Many scientific applications make use of the trigonometric functions sine (sin), cosine (cos), and tangent (tan) and their reciprocal functions cosecant (csc), secant (sec), and cotangent (cot). Trigonometric functions often require the use of floating-point numbers, and many hardware implementations of trigonometric functions use algorithms from the Coordinate Rotation Digital Computer (CORDIC) family of algorithms that compute the trigonometric function result through an iterative approximation.

Iterative implementations consume low resources and are preferred when implemented in the floating-point unit (FPU) of processors. Unrolled implementations are often encountered in computational datapaths targeting high throughput and are characterized by multiple, deep arithmetic structures, with each level containing a wide adder. Unrolled implementations may require large amounts of resources (e.g., chip area) and may result in long latencies (e.g., caused by register pipelining). Some unrolled implementations may encounter difficulties to close timing when resources are restricted.

Architectures based on polynomial approximations can be used to implement the sine, cosine and division, for example utilizing the inverse function. However, these approaches are often wasteful when implementing the tangent operation by means of operator assembly, since this involves coupling a sine and a cosine operator circuit with a division operator circuit.

Therefore, it may be desirable to provide a tangent operator circuit in an integrated circuit device that consumes low resources and has a high throughput combined with low latencies.

It will be recognized by one skilled in the art, that the present exemplary embodiments may be practiced without some or all of these specific details. In other instances, well-known operations have not been described in detail in order not to unnecessarily obscure the present embodiments.

Figure 1:
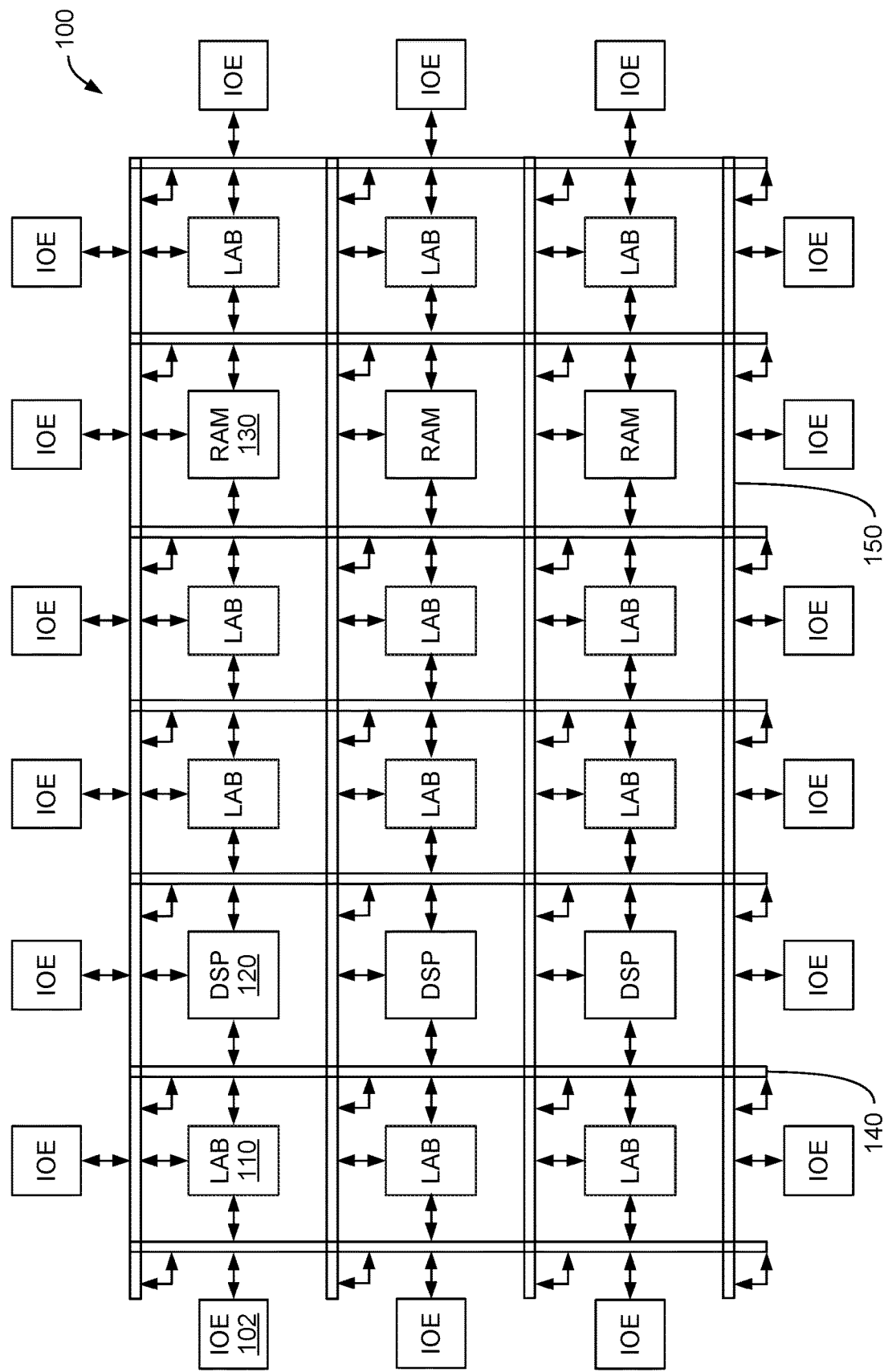
FIG. 1 shows a diagram of an illustrative integrated circuit such as a programmable integrated circuit in accordance with some embodiments.

FIG. 1 shows a diagram of an illustrative integrated circuit device such as programmable integrated circuit 100 in accordance with some embodiments.

Programmable integrated circuit 100 may have input-output circuitry 102 for driving signals off of programmable integrated circuit 100 and for receiving signals from other devices. Input-output circuitry 102 may include conventional input-output circuitry, serial data transceiver circuitry, differential receiver and transmitter circuitry, or other circuitry used to connect one integrated circuit to another integrated circuit.

As shown, input-output circuitry 102 may be located around the periphery of programmable integrated circuit 100. If desired, programmable integrated circuit 100 may have input-output circuitry 102 arranged in different ways. For example, input-output circuitry 102 may form one or more columns of input-output circuitry that may be located anywhere on the programmable integrated circuit (e.g., distributed evenly across the width of the programmable integrated circuit). If desired, input-output circuitry 102 may form one or more rows of input-output elements (e.g., distributed across the height of the programmable integrated circuit). Alternatively, input-output circuitry 102 may form islands of input-output elements that may be distributed over the surface of the programmable integrated circuit or clustered in selected areas.

Vertical interconnection resources 140 and horizontal interconnection resources 150 such as global and local vertical and horizontal conductive lines and buses may be used to route signals on programmable integrated circuit 100. Vertical and horizontal interconnection resources 140 and 150 include conductive lines and programmable connections between respective conductive lines and are therefore sometimes referred to as programmable interconnects, configurable interconnections, or configurable interconnect circuitry.

Programmable logic regions may include programmable components such as digital signal processing circuitry 120 and storage circuitry 130 which both may be organized in specialized blocks, or other combinational and sequential logic circuitry organized in logic array blocks 110. The programmable logic regions may be configured to perform a custom logic function.

If desired, the digital signal processing circuitry 120 and storage circuitry 130 may have limited configurability. In some embodiments, the programmable logic region may include additional specialized blocks such as programmable phase-locked loop circuitry, programmable delay-locked loop circuitry, or other specialized blocks with limited configurability.

In some embodiments, digital signal processing circuitry 120 may be adaptable to efficiently implement floating-point trigonometric operations. For example, digital signal processing circuitry 120 may include storage circuits that store results for trigonometric operations or barrel shifter circuits to assist with encoding and decoding processes as described below.

Programmable integrated circuit 100 may include programmable memory elements. These memory elements can be loaded with configuration data (sometimes also referred to as programming data) using input-output circuitry 102. If desired, these memory elements may provide the control signal to the multiplexer in digital signal processing circuitry 120.

Once loaded, the memory elements each provide a corresponding static control signal that controls the operation of an associated logic component in a programmable logic region. In a typical scenario, the outputs of the loaded memory elements are applied to the gates of transistors in the programmable logic region to turn certain transistors on or off and thereby configure the logic and the routing paths in the programmable logic region. Programmable logic circuit elements that may be controlled in this way include parts of multiplexers (e.g., multiplexers used for forming routing paths in programmable interconnects), look-up tables, logic arrays, XOR, AND, OR, NAND, and NOR logic gates, pass gates, inverters, etc.

Memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements are loaded with configuration data during programming, memory elements are sometimes referred to as configuration memory, configuration RAM, or programmable memory elements.

The circuitry of programmable integrated circuit 100 may be organized using any suitable architecture. As an example, the logic of programmable integrated circuit 100 may be organized in a series of rows and columns of larger programmable logic regions each of which contains multiple smaller logic regions.

The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs) or slices. Each region of logic may include a pair of adders, a pair of associated registers, shift registers, and one or more look-up tables or other block of shared combinational logic (i.e., resources from a pair of LEs—sometimes referred to as adaptive logic elements (ALEs) in this context). The larger regions may be, for example, logic array blocks (LABs) or configurable logic blocks (CLBs) containing multiple logic elements or multiple ALMs or multiple slices.

During device programming, configuration data is loaded into programmable integrated circuit 100 that configures the programmable logic regions so that their logic resources perform desired logic functions.

In some embodiments, programmable integrated circuit 100 may be configured to implement trigonometric functions. For example, digital signal processing circuitry 120, storage circuitry 130, and other resources in the programmable logic regions may be configured to implement a floating-point tangent operation (i.e., to implement a circuit that receives a floating-point number and generates the tangent of the floating-point number in floating-point number format).

Floating-point numbers are commonplace for representing real numbers in scientific notation in computing systems and are designed to cover a large numeric range and diverse precision requirements. The IEEE 754 standard, ANSI/IEEE Std. 754-2008, published Aug. 29, 2008, is commonly used for floating-point numbers. A representation of a floating-point number is shown in FIG. 2.

Figure 2:
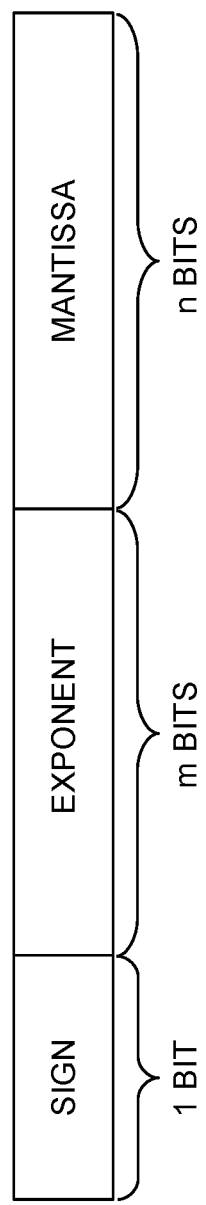
FIG. 2 is a diagram of an illustrative binary floating-point number representation in accordance with some embodiments.

As shown in FIG. 2, a floating-point number includes three different parts: a sign including, a mantissa sometimes also referred to as a significand, and an exponent. Each of these parts may be represented by a binary number and, in the format of the IEEE 754 standard, have different bit sizes depending on the precision. For example, a single-precision floating-point number requires 32 bits, which are distributed as follows: one sign bit (bit 31), eight exponent bits (i.e., m=8 using bits [30:23]), and 23 mantissa bits (i.e., n=23 using bits [22:0]). A double-precision floating-point number requires 64 bits including one sign bit (bit 63), 11 exponent bits (i.e., m=11 using bits [62:52]), and 52 mantissa bits (i.e., n=52 using bits [51:0]). A half-precision floating-point number requires 16 bits including one sign bit (bit 15), five exponent bits (i.e., m=5 using bits [14:10]), and 10 mantissa bits (i.e., n=10 using bits [9:0]).

According to the IEEE 754 standard, a mantissa may also have additional bits. A mantissa that has additional bits is sometimes also referred to as an extended mantissa.

The sign of a floating-point number according to the IEEE 754 standard is represented using a single bit, where a zero denotes a positive number and a one denotes a negative number.

The exponent of a floating-point number is preferably represented as an unsigned binary number which, for the single-precision format, ranges from 0 to 255. In order to map negative exponents to the representable exponent range, a positive bias is used. For single-precision floating-point numbers, the bias preferably is +127. For example, a value of 140 for the represented exponent actually represents an exponent of (140−127)=13, and a value of 100 represents (100−127)=−27. For double-precision and half-precision floating-point numbers, the exponent bias preferably is +1023 and +15, respectively.

Thus, a binary floating-point number of a given precision with the value of the bias 'bias' having the value 'sign' in the sign field, the value 'exponent' in the exponent field, and the value 'mantissa' represents the number $$(-1)^{'sign'} \times ('mantissa') \times 2^{('exponent'-'bias')} \quad (1)$$

As discussed above, according to the IEEE 754 standard, the mantissa is a normalized number with values in the interval [1,2) (i.e., greater than or equal to one and smaller than 2) and represents the precision component of a floating-point number as shown in equation (1)). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

The IEEE 754 standard also defines special cases. For example, a zero exponent with a zero mantissa represents '0', an all '1' exponent with a zero mantissa represents infinity, an all '1' exponent with a non-zero mantissa represents not-a-number (NaN), and a zero exponent with a non-zero mantissa represents a subnormal number.

A subnormal number, also known as a denormal number or a denormalized number, or as a gradual underflow, is a number that has a mantissa value smaller than one and an exponent equal to the smallest representable exponent, which for single-precision floating-point number format is 1−127=−126.

Figure 3:
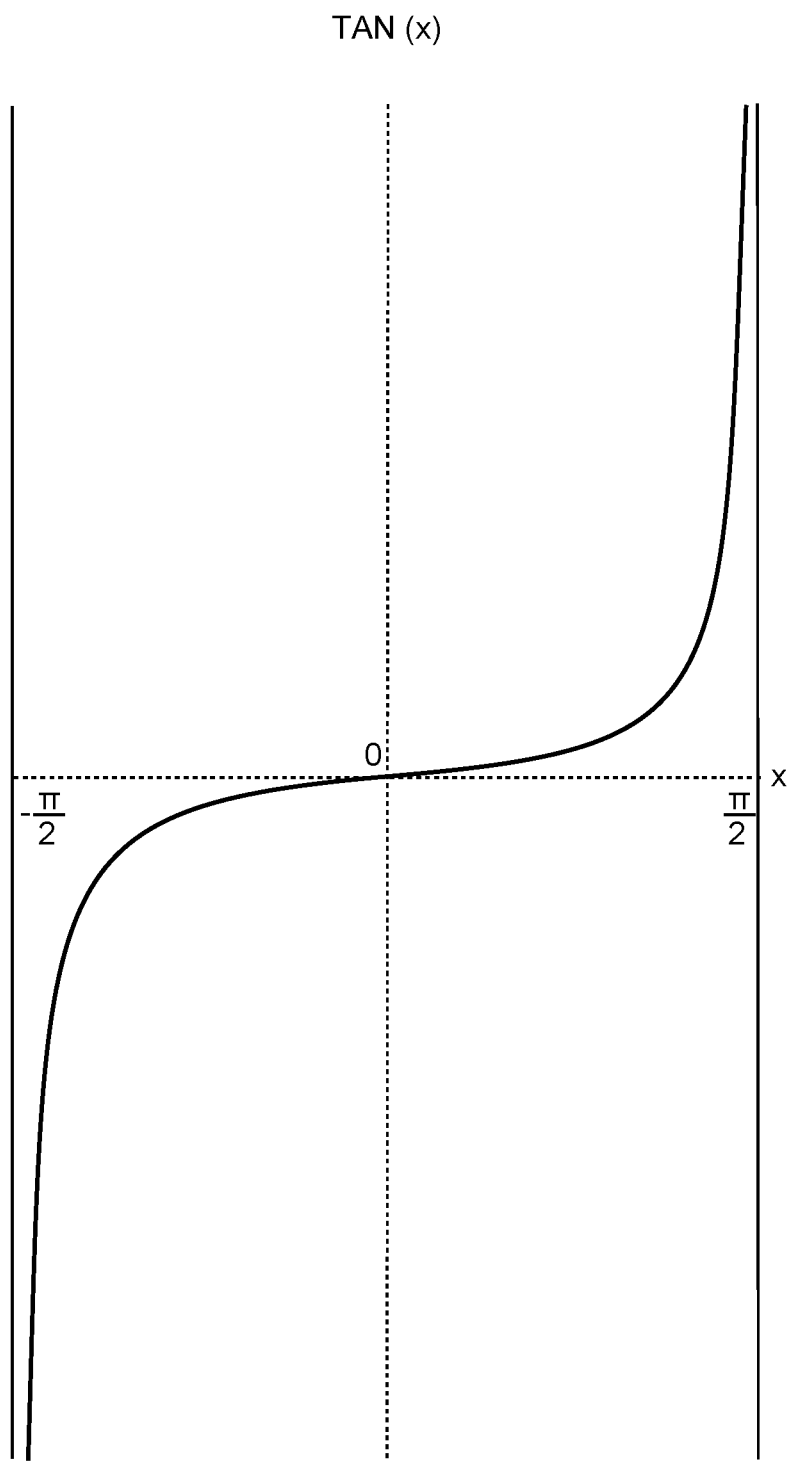
FIG. 3 is a diagram of an illustrative drawing of the tangent function in the interval between −π/2 and π/2 in accordance with some embodiments.

FIG. 3 is a diagram of an illustrative drawing of the tangent function in the interval between −π/2 and π/2 in accordance with some embodiments. The same shape repeats every π/2±kπ (i.e., the same shape repeats in the intervals between −3π/2 and −π/2, between −5π/2 and −3π/2, etc. and also between π/2 and 3π/2, between 3π/2 and 5π/2, etc.) In other words, the tangent function is periodic. Additionally, the tangent function is symmetric to the origin (i.e., tan(x)=−tan(−x)). Thus, one could restrict the input range of the tangent function to 0 to π/2, and derive values for the tangent function of any angle from the tangent functions of angles between 0 and π/2.

The Taylor expansion for the tangent function around the point x=0 is:

$$\tan(x) = x + \tfrac{1}{3}x^3 + \tfrac{2}{15}x^5 + \quad (2)$$

The input range of 0 to π/2 may be divided into two or more subranges in which the tangent function shows a particular behavior. As an example, if x is very small (e.g., smaller than $2^{-m/2}$ with m being the number of mantissa bits of FIG. 2) a good approximation for the tangent function is x (i.e., tan(x)=x for x<$2^{-m/2}$). This is due to the fact that the higher order terms in Equation 2 have weights lower than the least significant bit (LSB) of x and are shifted-out in the final summation. As another example, if x is close to π/2, the tangent function has an asymptotic behavior.

Figure 4:
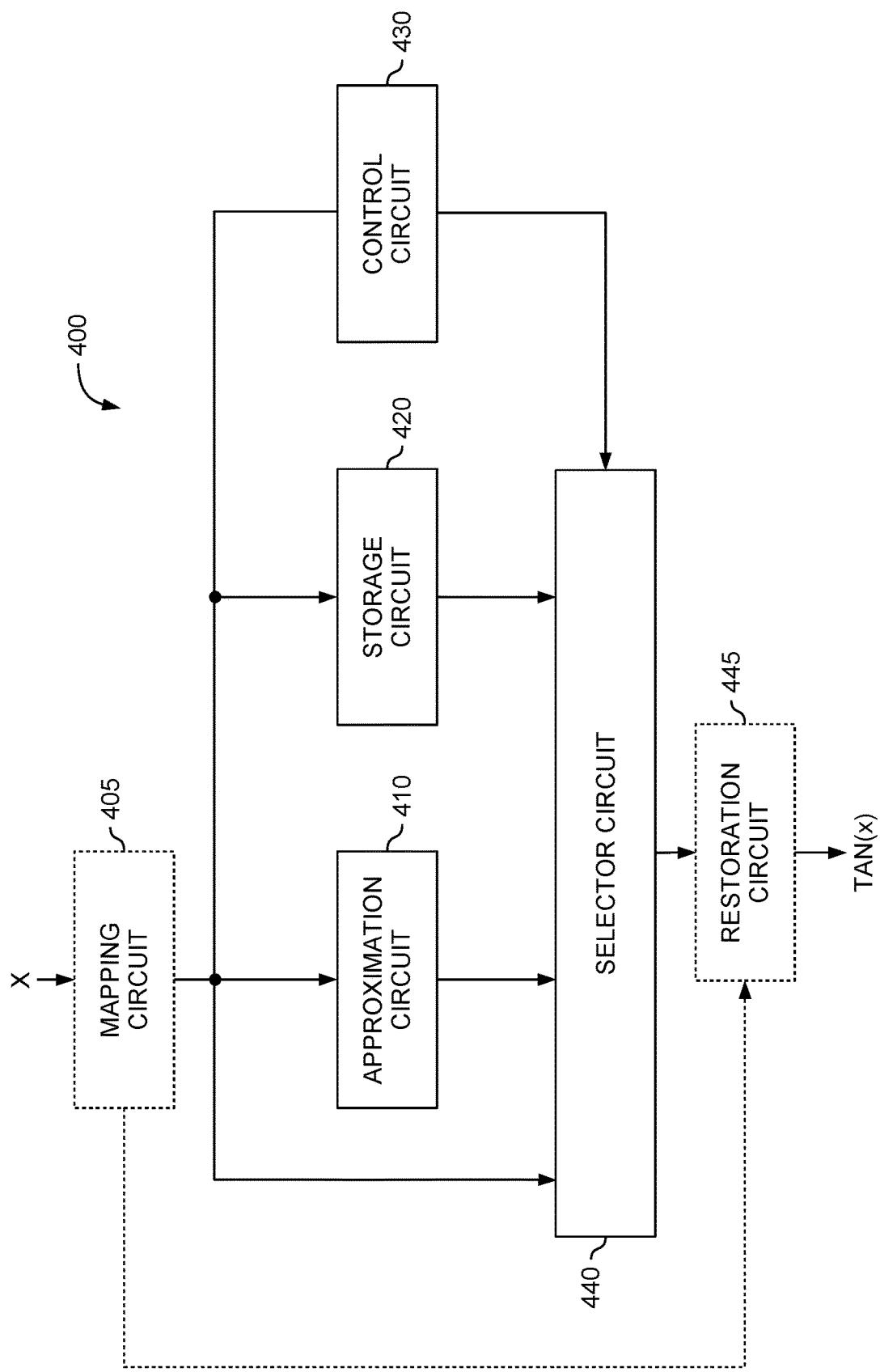
FIG. 4 is a diagram of an illustrative floating-point tangent operator circuit in accordance with some embodiments.

FIG. 4 is a diagram of an illustrative floating-point tangent operator circuit in accordance with some embodiments. Floating-point tangent operator circuit 400 may receive a floating-point number x and generate a floating-point number that is the tangent of x (i.e., tan(x)). As shown, floating-point tangent operator circuit 400 may include optional mapping circuit 405 and optional restoration circuit 445, approximation circuit 410, storage circuit 420, control circuit 430, and selector circuit 440.

A mapping circuit may map an input value from an original quadrant of the trigonometric circle to a predetermined input interval, and a restoration circuit may map the output value selected by the selection circuit back to the original quadrant of the trigonometric circle. For example, optional mapping circuit 405 may map the floating-point number x to the interval of zero to π/2. For example, mapping circuit 405 may receive the floating-point number x, recursively subtract if from the absolute value of the floating-point number x until the absolute value of the result is smaller than π/2. Mapping circuit 405 may then provide the absolute value of the result to approximation circuit 410, storage circuit 420, and control circuit 430, and send the sign of the result to optional restoration circuit 445.

As shown, selector circuit 440 may output the tangent of the absolute value of the result of the mapping function. Thus, restoration circuit 445 may restore the correct sign of the output to account for the symmetry tan(x)=−tan(−x) if the recursive subtraction in mapping circuit 405 leads to a number in the interval between −π/2 and zero. For example, restoration circuit 445 may replace the sign of the floating-point number out of selector circuit 440 with the sign received from mapping circuit 405.

For the remainder of this application and without loss of generality, the floating-point number x is meant to have already been mapped to the interval between zero and π/2.

Figure 9:
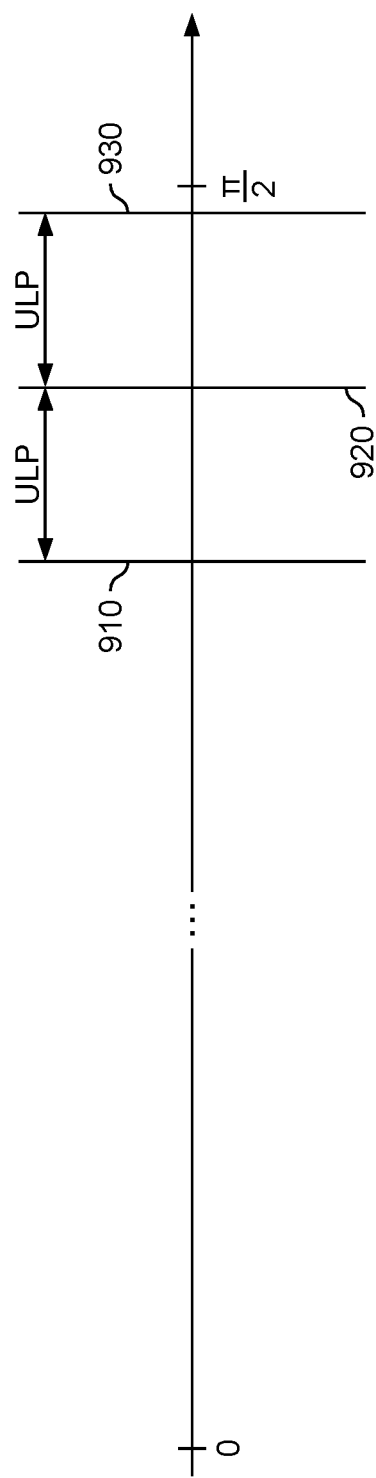
FIG. 9 is a diagram of two illustrative units in the last place (ULP) before π/2 in accordance with some embodiments.

Storage circuit 420 may be any addressable storage circuit such as look-up tables (LUTs), random-access memory (RAM) circuits, read-only memory (ROM) circuits, content-addressable memory (CAM) circuits, and register files, or any combination thereof. If desired, storage circuit 420 may store a predetermined number of values of the tangent function for a predetermined number of input values. For example, the storage circuit 430 may include q values of the tangent function for the floating-point numbers that are within q units in the last place (ULP) smaller than π/2. As an example, FIG. 9 shows three floating-point numbers that are smaller than π/2 and within three ULP of π/2.

Storage circuit 420 may receive an address signal that is based on input signal x and provide a corresponding value for tan(x) to selector circuit 440 in response to receiving the address signal.

Figure 6:
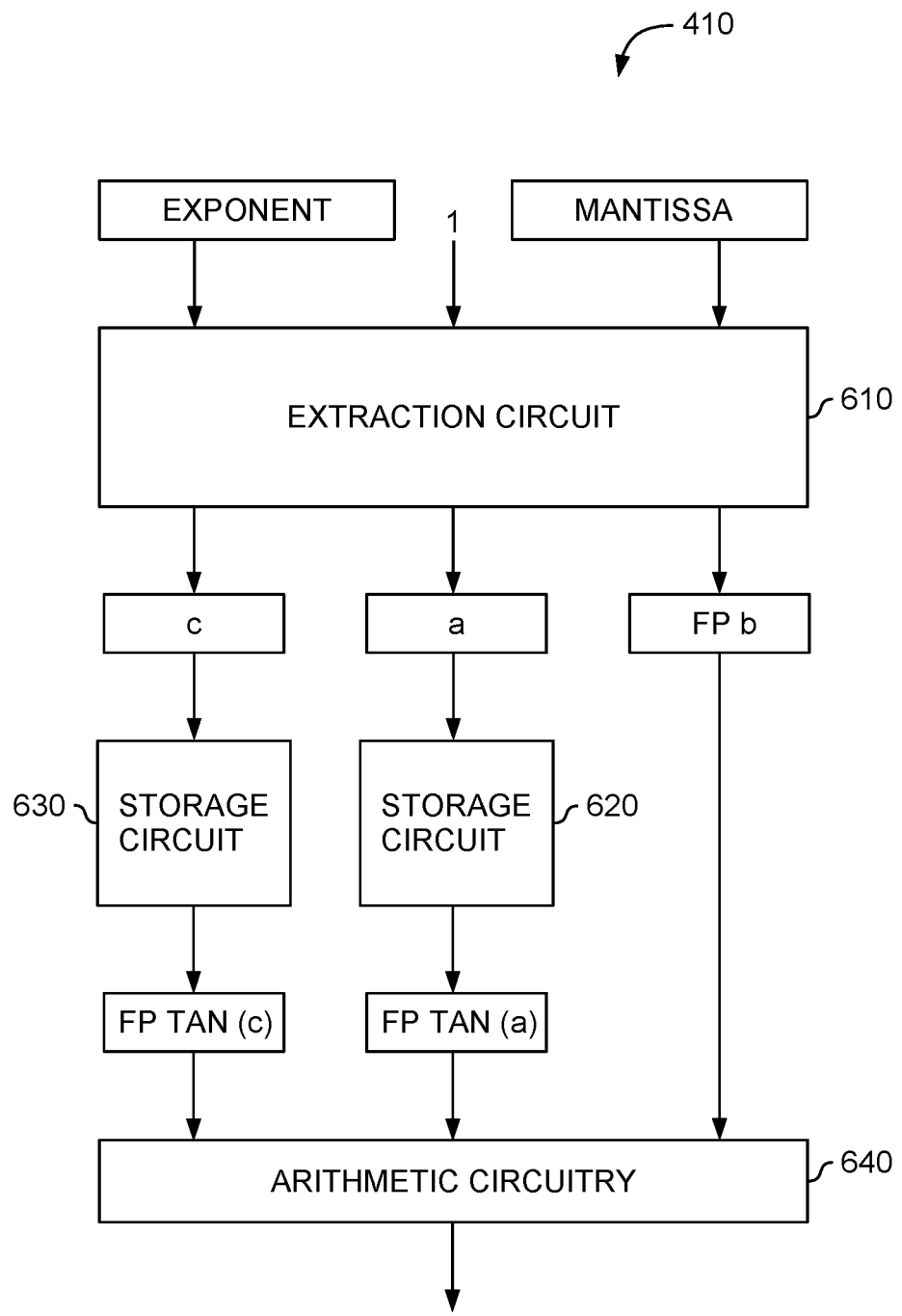
FIG. 6 is a diagram of an illustrative approximation circuit in a floating-point tangent operator circuit in accordance with some embodiments.

Approximation circuit 410 may receive input value x and generate a signal of an approximation of tan(x) and provide the signal of the approximation to selector circuit 440. Approximation circuit 410 may use any polynomial approximation method to generate an approximation of the tangent of the input value, such as the Taylor expansion of equation (2) or the Chebyshev expansion, just to name a few. As another example, approximation circuit 410 may implement the CORDIC algorithm, if desired. As yet another example, approximation circuit 410 may be implemented as shown in FIG. 6.

Floating-point tangent operator circuit 400 may use the particular behavior of the tangent function mentioned above. For example, control circuit 430 may direct selector circuit 440 to output x if x is below a first predetermined threshold (e.g., smaller than or equal to $2^{-m/2}$ or any other predetermined threshold that may or may not be based on the number of mantissa bits).

Similarly, control circuit 430 may direct selector circuit 440 to output a signal received from storage circuit 420 if x is above a second predetermined threshold (e.g., greater than or equal to π/2−q*ULP). In other words, control circuit 430 may direct selector circuit 440 to output a stored signal for tan(x) if x is less than or equal to q*ULP from π/2.

Control circuit 430 may direct selector circuit 440 to select the signal from approximation circuit 410 if x is between the first and second thresholds (e.g., greater than $2^{-m/2}$ and smaller than π/2−q*ULP).

For the tangent function, the input value x can be broken up into the sum of different ranges of bits of the input value x, using trigonometric identities for the tangent of a sum of values. Because some of the component ranges will be small, the identities will be simplified relative to those component ranges. The identities may be implemented in appropriate circuitry. The following identity holds true for the tangent function:

$$\tan(a+b) = \frac{\tan(a)+\tan(b)}{1-\tan(a)\tan(b)} \quad (3)$$

Further substituting equation (3) into itself to further decompose the input argument yields:

$$\tan(c+(a+b)) = \frac{\tan(c)+\frac{\tan(a)+\tan(b)}{1-\tan(a)\tan(b)}}{1-\tan(c)\left(\frac{\tan(a)+\tan(b)}{1-\tan(a)\tan(b)}\right)} \quad (4)$$

Although equation (4) looks complex, the properties of the tangent function, and the precision of single precision arithmetic, can be used to greatly simplify the calculation.

As shown above, tan(x)≈x for small x. In single-precision floating-point arithmetic (e.g., under the IEEE 754 standard) the exponent is offset by 127 (i.e., $1=2^0$ is represented with exponent value 127 in single-precision floating-point format). If the input exponent is 115 or less (i.e., a true exponent of −12 or less), the error between tan(x) and x is below the precision of the number format, therefore below that value, tan(x) can be considered equal to x.

For the single-precision floating-point number format, the approximation of the tangent function may therefore be limited to a relatively narrow exponent range, between 115 and 127, or 12 bits of dynamic range. For arithmetic operations, according to the IEEE 754 standard, the precision is 24 bits (23 bits of mantissa plus the implicit leading one). Thus, the input number may be represented accurately as a 36-bit fixed-point number (24 bits precision+12 bits dynamic range).

Similar estimations can be made for half-precision floating-point numbers, double-precision floating-point numbers, and quadruple-precision floating-point numbers.

Figure 5:
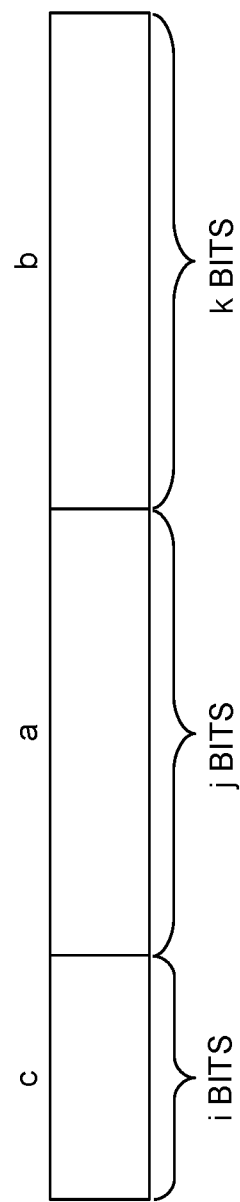
FIG. 5 is a diagram of an illustrative binary fixed-point number representation in accordance with some embodiments.

Such a fixed-point number can then be split into a predetermined number of components. FIG. 5 shows a splitting of a fixed-point number into components a, b, and c. If x=a+b+c as indicated above, the upper i bits can be designated the c component, the next j bits can be designated the a component, and the k least significant bits (LSBs) may be designated the b component.

As discussed above, tan(x)=x for any value of x that is smaller than $2^{-m/2}$ with m being the number of mantissa bits of FIG. 2. Consider the scenario in which i and j are selected such that m/2<(i+j−1). In this scenario, b<$2^{-m/2}$, and the tangent of b can be approximated as tan(b)=b and equation (4) can be simplified as follows:

$$\tan(a+b+c) = \frac{\tan(c)+\frac{\tan(a)+b}{1-b\tan(a)}}{1-\tan(c)\left(\frac{\tan(a)+b}{1-b\tan(a)}\right)} \quad (5)$$

Based on the selection of i, the tangent of a (i.e., tan(a)) may be relatively small. As an example, for i=j=9 and x being a single-precision floating-point number, the maximum value of a is slightly less than 0.0039062510 (tan(a) =0.0039062710) and the maximum value of b is 0.0000152610, which is also its tangent.

Therefore, the maximum value of tan(a)×b is 5.96×$10^{-8}$, and the minimum value of 1−tan(a)×b is 0.9999999410. The maximum value of tan(a)+b is 0.0039215286610. The difference between the maximum value of tan(a)+b, and the maximum value of tan(a)+b divided by the minimum value of 1−tan(a)×b is 2.35×$10^{-10}$. In other words, the error is 32 bits to the right of the decimal point. In the worst case, where c is zero, this error would not be in the precision of the result either, which is only 24 bits in the single-precision floating-point number format. Thus, with the approximation 1−tan(a)b=1, equation (5) can be further simplified to:

$$\tan(a+b+c) = \frac{\tan(c) + \tan(a) + b}{1 - \tan(c)(\tan(a) + b)} \quad (6)$$

Insofar as a and c are represented using i and j bits respectively, the tangents for all possible bit combinations may be stored in storage circuits. An embodiment of this tangent calculation is shown implemented in approximation circuitry 410 of FIG. 6.

As shown in FIG. 6, approximation circuitry 410 may include extraction circuit 610, storage circuits 620 and 630, and arithmetic circuitry 640.

Extraction circuitry 610 may receive input value x in form of a floating-point number having an exponent, a leading one, and a mantissa. Based on the received input value x, extraction circuit 610 may generate numbers c and a in fixed-point number format (i.e., c and a) and number b in floating-point number format (i.e., FP b). If desired, c, a, and b may be components c, a, and b of the fixed-point number shown in FIG. 5. An illustrative embodiment of extraction circuit 610 is shown in FIGS. 7 and 8.

Address signals, based on the values of c and a, may access respective storage circuits 630 and 620 to retrieve the corresponding tangents of c and a in floating-point number format (i.e., FP tan(c) and FP tan(a)) during a read access operation. Arithmetic circuitry 640 may receive b and the tangents of c and a in floating-point number format (i.e., FP b, FP tan(c), and FP tan(a)) and implement any one of equations (5) or (6) to determine an approximation of the tangent of x (i.e., tan(x)) in floating-point number format.

Figure 7:
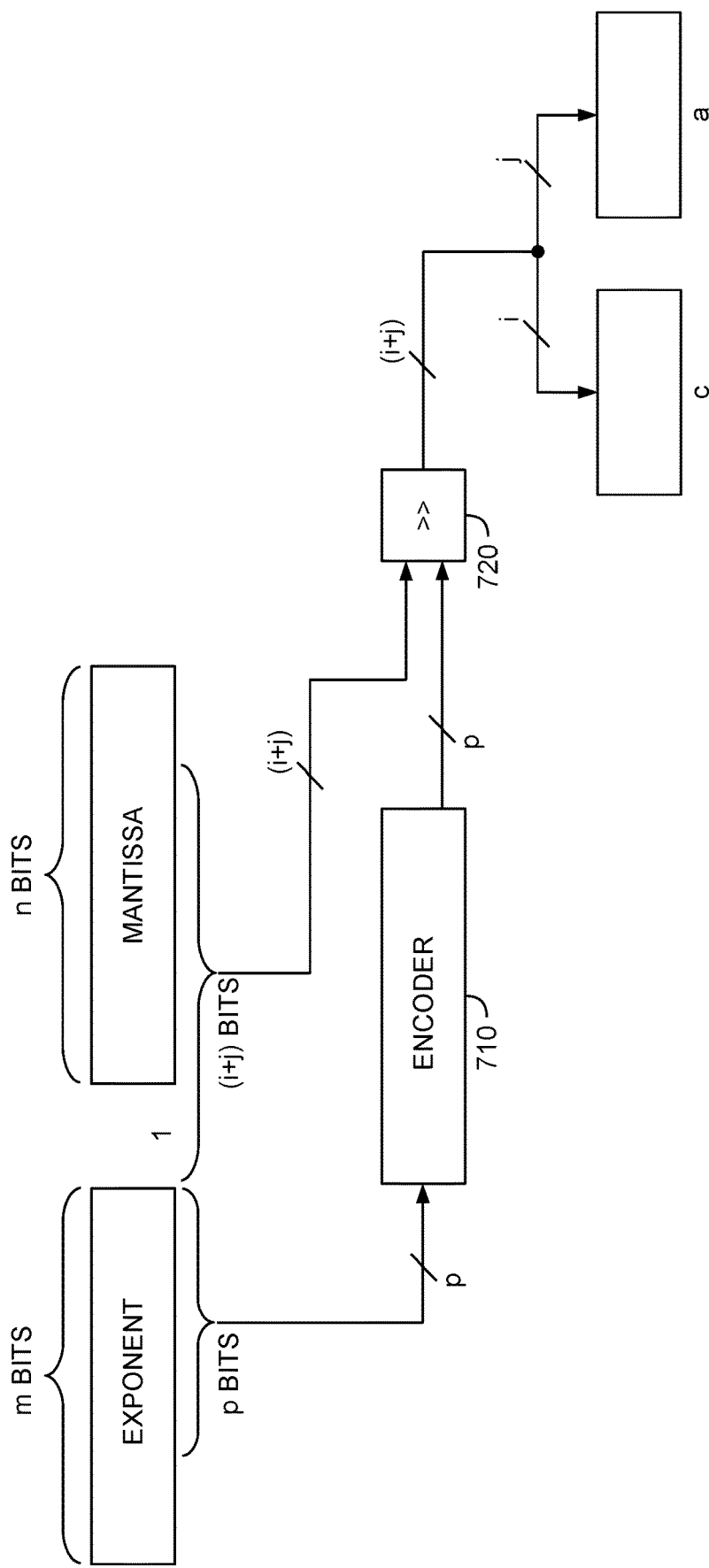
FIG. 7 is a diagram of an illustrative extraction circuit that generates two portions of a fixed-point number based on a floating-point number in accordance with some embodiments.
Figure 8:
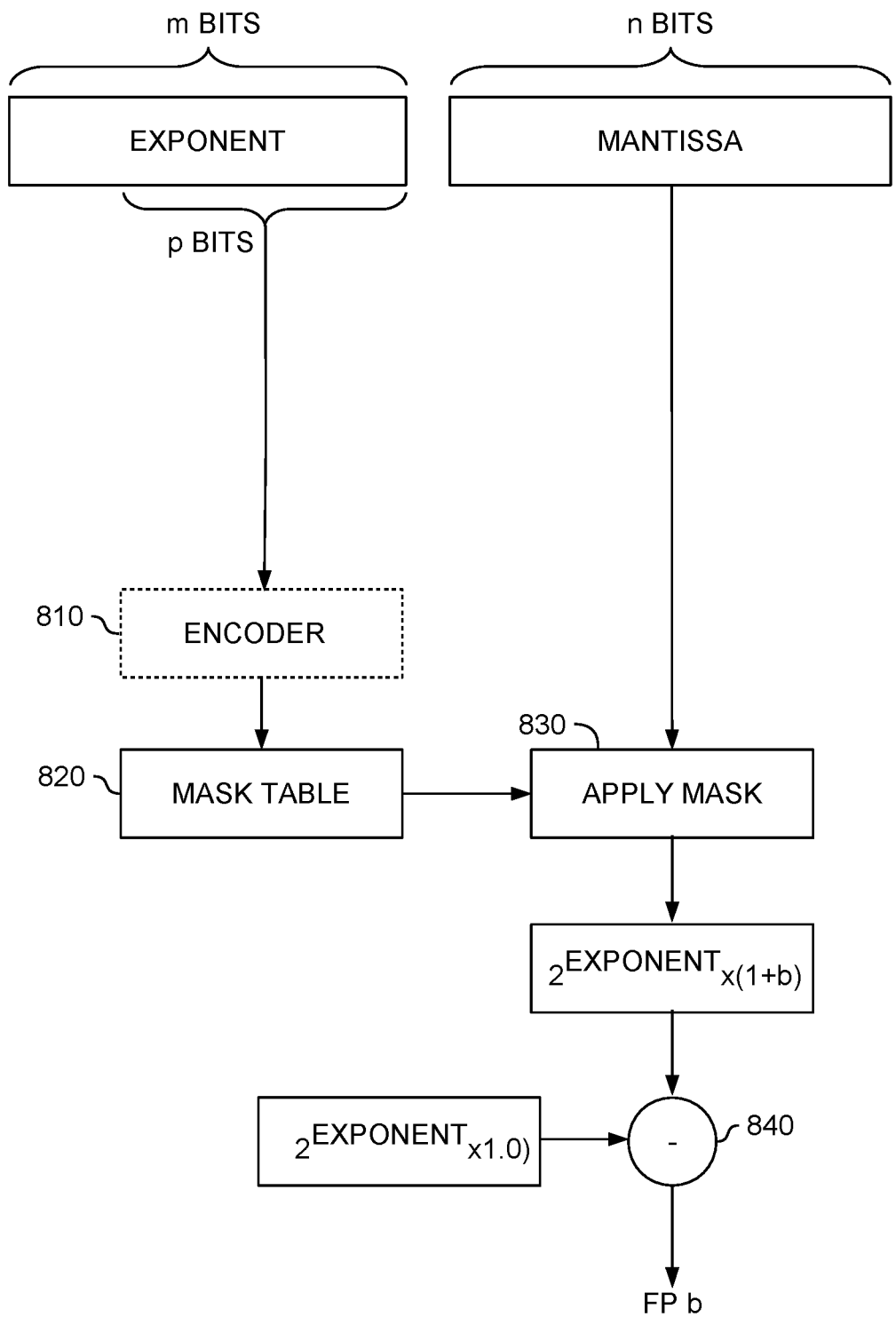
FIG. 8 is a diagram of an illustrative extraction circuit that generates a portion of a fixed-point number based on a floating-point number in accordance with some embodiments.

FIG. 7 shows an illustrative diagram of an extraction circuit in accordance with some embodiments. As shown in FIG. 7, the extraction circuit may receive a floating-point number according to the floating-point number format shown in FIG. 2 together with the leading one between the exponent and mantissa bits and generate the i-bits and j-bits that constitute portions c and a of the fixed-point number shown in FIG. 5.

As shown in FIG. 7, the extraction circuit may include an encoder circuit 710 and a right shift circuit 720. Encoder circuit 710 may receive p-bits from the exponent and determine a number of bits by which to shift to the right in right shift circuit 720.

The number p of bits that the encoder receives from the exponent may be selected based on the numbers i and j. For example, p may be determined such that $2^p \geq (i+j)$. In fact, shifting the leading one of the floating-point number by (i+j) bits to the right may lead to c and a being zero. Hence, shifting further and adding more zeros is unnecessary.

Encoder circuit 710 may account for the bias of the floating-point number format. For example, consider the scenario in which i=j=9, p=5, and the exponent is 120 (i.e., $01111000_2$ in single-precision floating-point arithmetic under the IEEE 754 standard), which corresponds to a true exponent of −7 because the exponent is offset by 127. In this scenario, encoder circuit 710 may receive the five LSBs of the exponent (i.e., $11000_2$) and output the number seven (i.e., $00111_2$).

The floating-point number may be limited to the interval between zero and π/2 for the tangent function. Thus, the true exponent is smaller than or equal to zero in binary number format. According to the IEEE 754 standard, the exponent bias of a floating-point number is selected to have all ones except for the MSB (i.e., $01111111_2$ for the single-precision floating-point number format), and a true exponent that is smaller than or equal to zero is encoded using zeros instead of ones and ones instead of zeros in all but the MSB of the exponent of the floating-point number. For example, a true exponent of −24 may be encoded as $01100111_2$ in single-precision floating-point number format. Hence, in some embodiments, encoder circuit 710 may include inverters that bitwise invert the p-bits received from the exponent, and these inverters may be built into right shift circuit 720, if desired.

Right shift circuit 720 may receive the leading one and the following (i+j−1) most significant bits (MSBs) of the mantissa and shift these bits to the right according to the number determined in encoder circuit 710. Right shift circuit 720 may be a barrel shifter that inserts a zero at the most significant bit position for every bit that is right shifted.

The i-MSBs out of right shift circuit 720 may be assigned to c and the next j-bits out of right shift circuit 720 may be assigned to a.

FIG. 8 shows an illustrative diagram of an extraction circuit in accordance with some embodiments. As shown in FIG. 8, the extraction circuit may receive a floating-point number according to the floating-point number format shown in FIG. 2 and generate a floating-point number b (i.e., FP b) that represents portion b of the fixed-point number shown in FIG. 5 in floating-point number format.

As shown in FIG. 8, the extraction circuit may include optional encoder circuit 810, mask table 820, apply mask circuit 830, and floating-point subtractor 840. Encoder circuit 810 may receive p-bits from the exponent and generate an address signal to retrieve a k-bit binary mask stored in mask table 820. Mask table 820 may be one or more storage circuits that together are able to store $2^p$ masks that are each n-bits wide. For example, a predetermined number of look-up tables (LUTs) or a random-access memory (RAM) may implement mask table 820.

As an example, consider the scenario in which mask table 820 is a storage circuit that stores at address zero the mask that needs to be applied when the true exponent is zero (i.e., the exponent of a single-precision floating-point number is 127 or $01111111_2$ in single-precision floating-point format), at address one the mask that needs to be applied when the true exponent is minus one (i.e., $126_{10}$ or $01111110_2$ in single-precision floating-point number format), etc. In this scenario, encoder circuit 810 may be a bitwise inverter circuit or, if desired, a subtractor that subtracts the exponent bits from the corresponding bias bits. Alternatively, encoder circuit 810 may be any circuitry that receives p-bits and generates another p-bits in response. For example, encoder circuit 810 may include a barrel shifter, a storage circuit, or combinational logic, just to name a few.

As an example, the mask that needs to be applied when the true exponent is zero may include (i+j−1) MSBs that are zero and (n−i−j+1) LSBs that are one, the mask that needs to be applied when the true exponent is one may include (i+j−2) MSBs that are zero and (n−i−j+2) LSBs that are one, . . . , and the mask that needs to be applied when the true exponent is (i+j−1) or greater may include no zeros and n-bits that are one.

Note, that in this example, the (n−i−j+1) LSBs of the mask that needs to be applied are all ones independent of the value of the true exponent. Thus, in some embodiments, mask table 820 may only store the (i+j−1) MSBs of the mask that needs to be applied and concatenate the (i+j−1) bits retrieved from mask table 820 with (n−i−j+1) bits that are all ones.

Apply mask circuit 830 may apply the mask retrieved from mask table 820 to the n-bit mantissa, thereby generating $(1+b)*2^{EXPONENT}$. For example, a bitwise logical AND circuit may implement apply mask circuit 830.

Floating-point subtractor 840 may subtract $1.0*2^{EXPONENT}$ from this number to generate b in floating-point number format (i.e., FP b).

Figure 10:
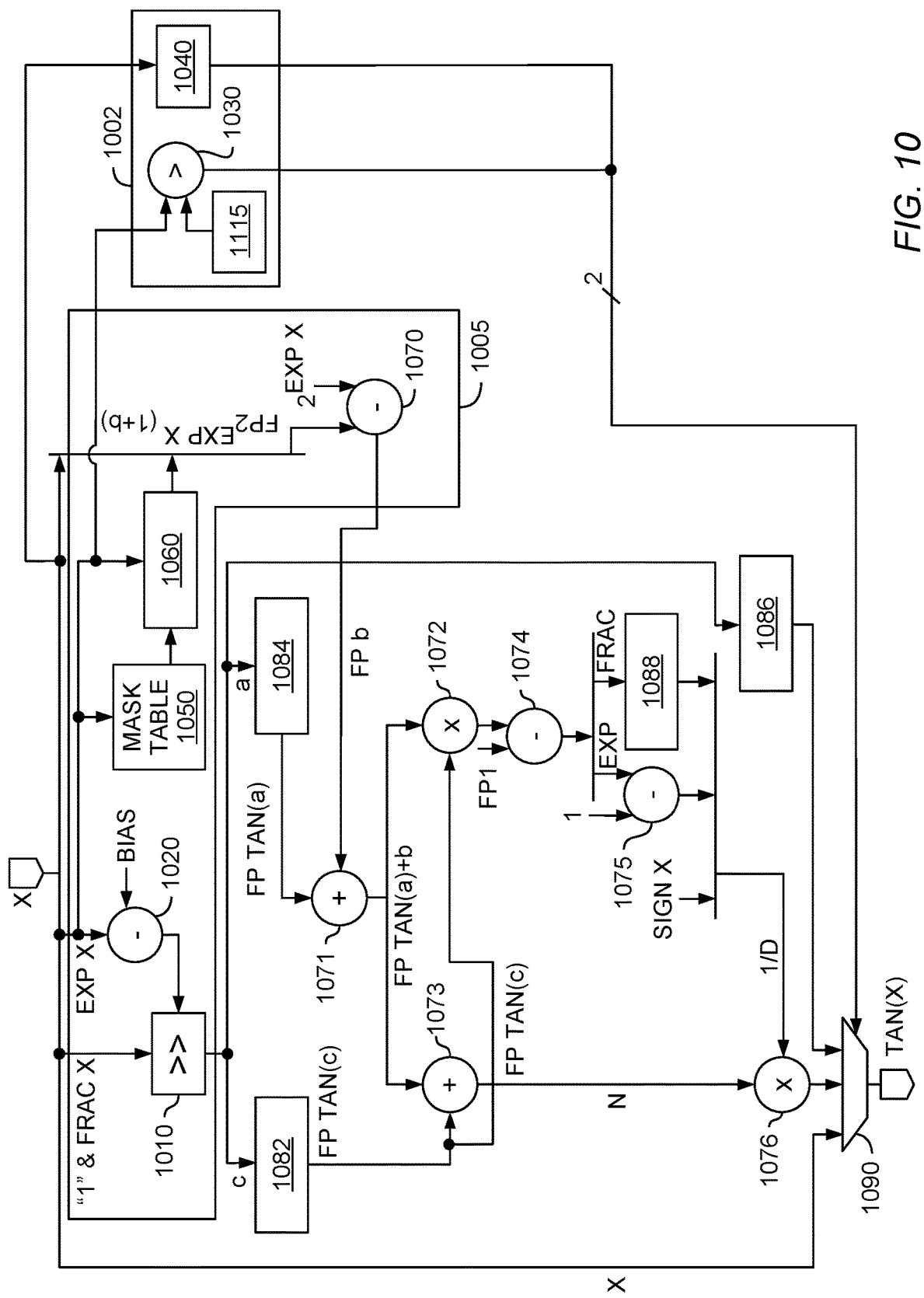
FIG. 10 is a diagram of an illustrative floating-point tangent operator circuit that selects between three approximations in accordance with some embodiments.

FIG. 10 is a diagram of an illustrative floating-point tangent operator circuit that selects between three approximations in accordance with some embodiments. As shown, the floating-point tangent operator circuit includes control circuit 1002, which may include threshold indicator circuit 1115, comparator 1030, and upper threshold check circuit 1040, extraction circuit 1005, which may include right shift circuit 1010, fixed-point subtractor 1020, mask table 1050, apply mask circuit 1060, and floating-point subtractor 1070, fixed-point subtractor 1075, storage circuits 1082, 1084, and 1086, floating-point adder 1071, floating-point subtractor 1074, floating-point multipliers 1072 and 1076, mantissa inversion circuit 1088, and multiplexer 1090.

Extraction circuit 1005 may receive the floating-point number x and generate fixed-point numbers c and a and floating-point number FP b. If desired, extraction circuit 1005 may use right shift circuit 1010 and fixed-point subtractor 1020 to extract fixed-point numbers c and a (e.g., portions c and a of the fixed-point number of FIG. 5) from input value x. In some embodiments, extraction circuit 1005 may be extraction circuit 610 of FIG. 6.

If desired, the floating-point tangent operator may use mask table 1050, apply mask circuit 1060, and floating-point subtractor 1070 to extract b (e.g., portion b of the fixed-point number of FIG. 5) in floating-point number format (i.e., FP b). In some embodiments, mask table 1050, apply mask circuit 1060, and floating-point subtractor 1070 may be mask table 820, apply mask circuit 830, and floating-point subtractor 840 of FIG. 8, respectively.

The floating-point tangent operator circuit may retrieve tan(c) and tan(a) in floating-point number format based on c and a from storage circuits 1082 and 1084, respectively. Floating-point adder 1071 may add tan(a) and FP b, and floating-point adder 1073 may add the sum out of floating-point adder 1071 to tan(c) to generate the numerator of equation (6).

Floating-point multiplier 1072 may multiply tan(c) with the sum out of floating-point adder 1071, and floating-point subtractor 1074 may subtract the result from one to generate the denominator of equation (6).

The output of floating-point subtractor 1074 may be inverted using fixed-point subtractor 1075 and mantissa inversion circuit 1088. For example, fixed point subtractor 1075 may generate the exponent and mantissa inversion circuit 1088 the mantissa of the inverted denominator of equation (6).

For example, mantissa inversion circuit 1088 may compute the reciprocal of the mantissa of the floating-point number out of floating-point subtractor 1074. If desired, mantissa inversion circuit 1088 may receive the fraction-only bits of the mantissa (i.e., FRAC) and account for the implicit leading one. In other words, mantissa inversion circuit 1088 may compute the function 1/1.FRAC. Since the denominator is in the interval [1,2) (i.e., the interval includes all values that are greater than or equal to 1.0 and smaller than 2.0), the output of mantissa inversion circuit 1088 may be in the interval (0.5,1] (i.e., the interval includes all values that are greater than 0.5 and smaller than or equal to 1.0).

The reciprocal of the denominator in floating-point number format may require a normalized mantissa and an appropriate exponent. For example, the normalization of the output of mantissa inversion circuit 1088 may be shifted one bit to the left and the exponent may be decremented by one if the output of mantissa inversion circuit 1088 is smaller than 1.0 (i.e., if the MSB of the mantissa of the reciprocal of the denominator is zero).

The exponent of the reciprocal of the denominator in floating-point number format may require an inversion of the sign of the real exponent as opposed to the biased exponent. Consider the scenario in which the real exponent, the biased exponent, the inverted biased exponent, and the bias are denoted as EXPREAL, EXP, INVEXP, and BIAS, respectively. Consider further that the biased exponent is EXP=EXPREAL+BIAS before the inversion and hence EXPREAL=EXP−BIAS. In this scenario, the inverted biased exponent (i.e., the exponent of the reciprocal of the denominator) is INVEXP=−EXPREAL+BIAS=2*BIAS−EXP. In other words, the inverted biased exponent is equal to the difference between twice the bias (i.e., 2*BIAS) and the exponent of the denominator (i.e., EXP).

In the IEEE 754 standard, the bias for all floating-point precisions (i.e., for half-precision, single-precision, double-precision, and quadruple-precision) is a zero at the MSB position followed by ones in all other bit positions (e.g., $01111111_2$ in single-precision floating-point number format according to the IEEE 754 standard). Thus, twice the bias (i.e., 2*BIAS) is a zero in the LSB position and ones in all other bit positions (e.g., $11111110_2$ in single-precision floating-point number format according to the IEEE 754 standard).

As mentioned above, the normalization of the output of mantissa inversion circuit 1088 may involve that the inverted biased exponent be decremented by one if the MSB of the mantissa of the reciprocal of the denominator is zero. This can be accomplished in the same operation in which the exponent of the reciprocal of the denominator in floating-point number format is determined.

For example, consider the scenario in which the MSB of the mantissa of the reciprocal of the denominator is one (i.e., M=1). In this scenario, the mantissa is already normalized, no left shift is required, and the exponent of the reciprocal of the denominator may be determined by subtracting EXP from 2*BIAS (i.e., from $11111110_2$ in single-precision floating-point number format).

As another example, consider the scenario in which the MSB of the mantissa of the reciprocal of the denominator is zero (i.e., M=0). In this scenario, the mantissa needs to be normalized, a left shift by one bit is required, and the exponent of the reciprocal of the denominator may be determine by subtracting EXP from 2*BIAS−1 (i.e., from $11111101_2$ in single-precision floating-point number format).

Thus, for any precision in the IEEE 754 standard, the two LSBs of 2*BIAS (i.e., $10_2$) or the two LSBs of 2*BIAS−1 (i.e., $01_2$) may be replaced by M !M (i.e., by a concatenation of the MSB and the inversion of the MSB of the mantissa of the reciprocal of the denominator) to account for the normalization operation, if desired.

In some embodiments, mantissa inversion circuit 1088 may implement a piecewise polynomial approximation operation, Newton-Raphson iterations, or any other technique relevant for computing the reciprocal of a mantissa. Additionally, the mantissa inversion circuit 1088 may contain a 1-position normalization circuit which may be implemented using a multiplexer.

Floating-point multiplier 1076 may multiply the inverted denominator with the numerator to determine the tangent of the input value according to equation (6).

Control circuit 1002 may determine if x is below a first predetermined threshold (e.g., smaller than or equal to $2^{-m/2}$ or any other predetermined threshold that may or may not be based on the number of mantissa bits). For example, threshold indicator circuit 1115 and comparator 1030 may determine whether the input value is less than the first predetermined threshold.

Similarly, control circuit 1002 may determine if x is above a second predetermined threshold (e.g., greater than or equal to $\pi/2-q*\text{ULP}$). For example, upper threshold check circuit 1040 may determine whether the input value is greater than the second predetermined threshold.

Multiplexer 1090 may select the output tan(x) based on the control signal from control circuit 1002. For example, control circuit 1002 may direct multiplexer 1090 to select the input value as the output (i.e., tan(x)=x) if control circuit 1002 determines that the input value is less than the first predetermined threshold, control circuit 1002 may direct multiplexer 1090 to select the output of storage circuit 1086, which may store the tangent values for a predetermined range of input values (e.g., for input values that are within an interval limited by $\pi/2-q*\text{ULP}$ and $\pi/2$) as the output tan(x) if control circuit 1002 determines that the input value is above the second predetermined threshold, and control circuit 1002 may direct multiplexer 1090 to select the output of floating-point multiplier 1076 if control circuit 1002 determines that the input value is greater than or equal to the first predetermined threshold and smaller than or equal to the second predetermined threshold.

Figure 11:
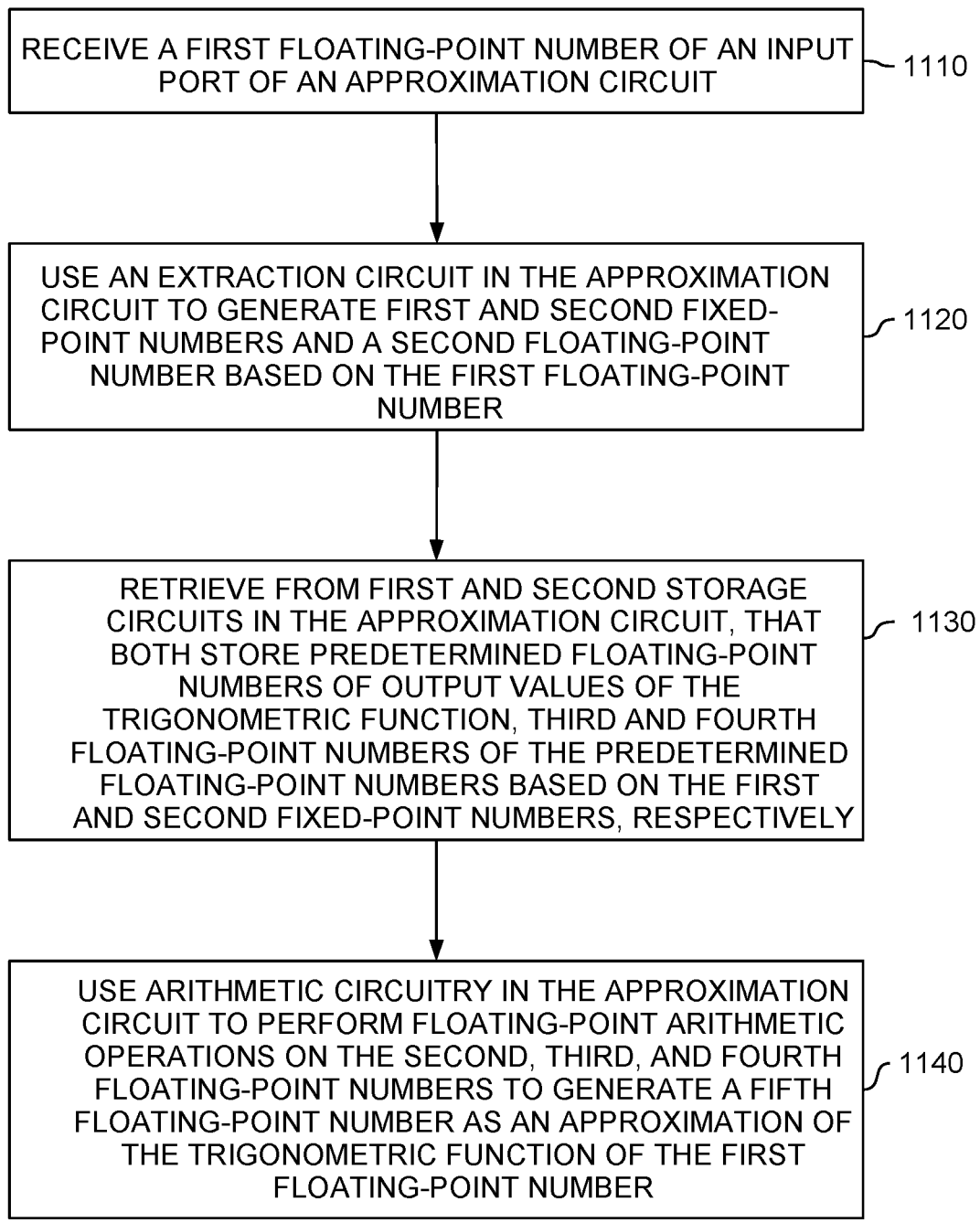
FIG. 11 is a flow chart of illustrative operations for computing a trigonometric function of a floating-point number in an integrated circuit in accordance with some embodiments.

FIG. 11 is a flow chart of illustrative operations for computing a trigonometric function of a floating-point number in an integrated circuit in accordance with some embodiments.

At 1110, the integrated circuit may receive a first floating-point number at an input port of an approximation circuit. For example, an integrated circuit such as programmable integrated circuit 100 of FIG. 1 may include floating-point tangent operator circuit 400 of FIG. 4 with approximation circuit 410 that receives a floating-point number x as a first floating-point number at an input port.

At 1120, the integrated circuit may use an extraction circuit in the approximation circuit to generate first and second fixed-point numbers and a second floating-point number based on the first floating-point number. For example, extraction circuit 610 of approximation circuit 410 of FIG. 6 may generate fixed-point numbers a and c and floating-point number FP b.

At 1130, the integrated circuit may retrieve from first and second storage circuits in the approximation circuit, that both store predetermined floating-point numbers of output values of the trigonometric function, third and fourth floating-point numbers of the predetermined floating-point numbers based on the first and second fixed-point numbers, respectively. For example, storage circuits 620 and 630 of approximation circuit 410 in FIG. 6 may store predetermined floating-point numbers of output values of the trigonometric functions, and fixed-point numbers a and c may access storage circuits 620 and 630 to retrieve floating-point numbers FP TAN(a) and FP TAN(b), respectively.

At 1140, the integrated circuit may use arithmetic circuitry in the approximation circuit to perform floating-point arithmetic operations on the second, third, and fourth floating-point numbers to generate a fifth floating-point number as an approximation of the trigonometric function of the first floating-point number. For example, arithmetic circuitry 640 of FIG. 6 may perform floating-point arithmetic operations on FP b, FP TAN(a), and FP TAN(c) to generate a floating-point number at the output of arithmetic circuitry 640 that is an approximation of the trigonometric function of the floating-point number x.

Although the operations 1110, 1120, 1130, and 1140 were described in a specific order, it should be understood that other operations may be performed in between described operations, described operations may be adjusted so that they occur at slightly different times or described operations may be distributed in a system which allows the occurrence of the processing operations at various intervals associated with the processing. For example, operation 1120 may be performed before, after, or at the same time as operation 1130.

A machine-readable medium may encode instructions for carrying out a method (e.g., instructions for configuring an arithmetic circuit to generate the tangent of a floating-point number) on an integrated circuit in accordance with some embodiments. A suitable computer or similar device may execute these instructions, thereby implementing the method in the integrated circuit. For example, a personal computer may be equipped with an interface to which the integrated circuit may be connected, and suitable software tools and/or a user, with the help of the personal computer, may program the method into the integrated circuit through the interface.

In some embodiments, the instructions for carrying out the method may be generated by other instructions that are encoded on the same or an additional machine-readable medium. In other words, a first set of instructions (e.g., a C-language compiler or an electronic design automation (EDA) tool) executed on a computer or similar device may generate a second set of instructions (e.g., assembler code or a series of bits for programming configurable circuitry), whereby the second set of instructions includes the method that is executed on an integrated circuit (e.g., a microprocessor or a programmable integrated circuit device such as programmable integrated circuit 100 of FIG. 1).

A machine-readable medium may include any type of device or technology that allows for the storage of instructions including semiconductor memory which may be volatile (e.g., dynamic random-access memory (DRAM), static random-access memory (SRAM), etc.) or non-volatile (e.g., programmable read-only memory (PROM), flash memory, etc.), magnetic storage devices, optical storage devices, or a combination thereof.

Figure 12:
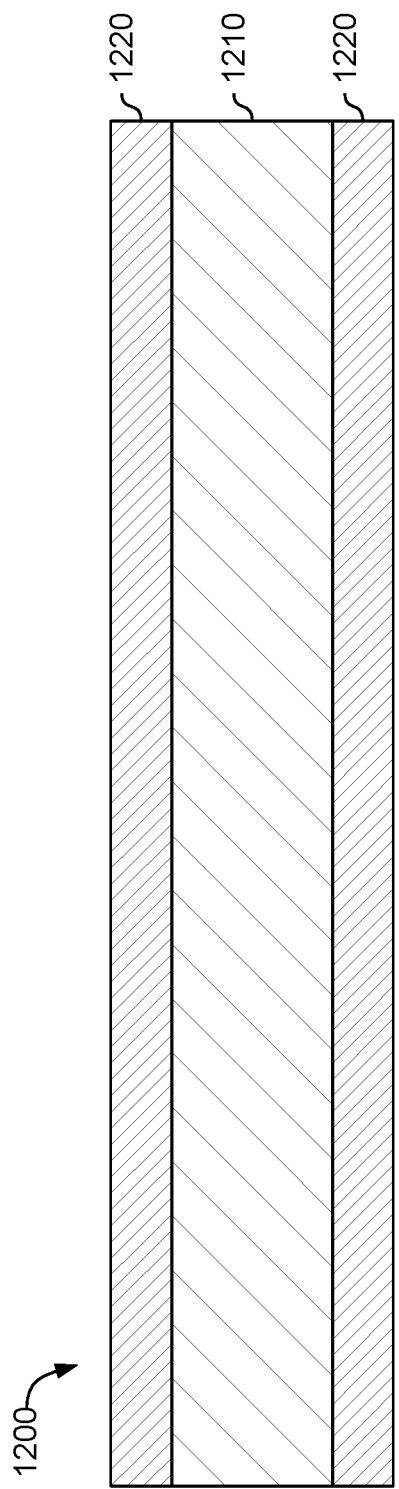
FIG. 12 is a cross-sectional view of a magnetic data storage medium encoded with a set of machine-executable instructions for configuring an integrated circuit to perform an arithmetic operation of first and second floating-point numbers in accordance with some embodiments.

FIG. 12 presents a cross section of a magnetic data storage medium 1200 which may be encoded with a machine executable program that can be carried out by systems such as the aforementioned personal computer, or other computer or similar device. Medium 1200 may be a floppy diskette or hard disk, or magnetic tape, having a suitable substrate 1210, which may be conventional, and a suitable coating 1220, which may be conventional, on one or both sides, containing magnetic domains whose polarity or orientation may be altered magnetically. Except in the case where it is magnetic tape, medium 1200 may also have an opening for receiving the spindle of a disk drive or other data storage device.

The magnetic domains of coating 1220 of medium 1200 may be polarized or oriented so as to encode, in manner which may be conventional, a machine-executable program, for execution by a programming system such as a personal computer or other computer or similar system, having a socket or peripheral attachment into which the integrated circuit to be configured may be inserted for the purpose of configuring appropriate portions of the integrated circuit, including its specialized processing blocks, if any, in accordance with some embodiments.

Figure 13:
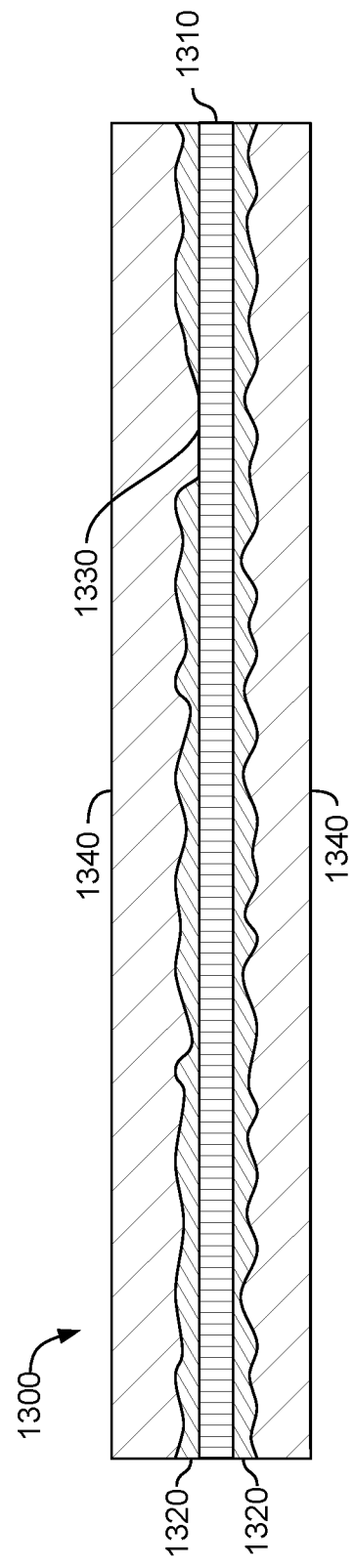
FIG. 13 is a cross-sectional view of an optically readable data storage medium encoded with a set of machine executable instructions for configuring an integrated circuit to perform an arithmetic operation of first and second floating-point numbers in accordance with some embodiments.

FIG. 13 shows a cross section of an optically-readable data storage medium 1300 which may be encoded with an aforementioned machine-executable program, to be carried out by systems such as the aforementioned personal computer, or other computer or similar device. Medium 1300 may be a Blu-ray disc (BD), a conventional compact disk (CD) read-only memory (ROM) or a digital versatile disk (DVD, sometimes also referred to as digital video disk) read-only memory (ROM), or any rewriteable medium such as a CD R, CD RW, DVD R, DVD RW, DVD+R, DVD+RW, or DVD-RAM or a magneto-optical disk which is optically readable and magneto-optically rewriteable. Medium 1300 may have a suitable substrate 1310 and a suitable coating 1320 usually on one or both sides of substrate 1310.

In the case of a CD-based or DVD-based medium, as is well known, coating 1320 is reflective and is impressed with a plurality of pits 1330, arranged on one or more layers, to encode the machine-executable program. The arrangement of pits is read by reflecting laser light off the surface of coating 1320. A protective coating 1340 may be provided on top of coating 1320.

In the case of magneto-optical disk, as is well known, coating 1320 has no pits 1330, but has a plurality of magnetic domains whose polarity or orientation may be changed magnetically when heated above a certain temperature, for example by a laser. The orientation of the domains may be read by measuring the polarization of laser light reflected from coating 1320. The arrangement of the domains may encode the program as described above.

The method and apparatus described herein may be incorporated into any suitable circuit or system of circuits. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using circuitry that efficiently generates the tangent of a floating-point number is desirable.

The integrated circuit device may be configured to perform a variety of different logic functions. For example, the integrated circuit device may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination.

The following examples pertain to further embodiments.

Example 1 is circuitry for computing a trigonometric function of a first floating-point number, comprising: an approximation circuit that receives the first floating-point number at an input port and comprises: an extraction circuit coupled to the input port that generates first and second fixed-point numbers and a second floating-point number based on the first floating-point number, first and second storage circuits coupled to the extraction circuit that both store predetermined floating-point numbers of output values of the trigonometric function and output third and fourth floating-point numbers of the predetermined floating-point numbers based on the first and second fixed-point numbers, respectively, and arithmetic circuitry coupled to the extraction circuit and the first and second storage circuits that performs floating-point arithmetic operations on the second, third, and fourth floating-point numbers to generate a fifth floating-point number as an approximation of the trigonometric function of the first floating-point number.

Example 2 is the circuitry of example 1, further comprising: a third storage circuit that stores additional predetermined floating-point numbers of additional output values of the trigonometric function and outputs a sixth floating-point number of the additional predetermined floating-point numbers based on the first floating-point number; and a selection circuit coupled to the third storage circuit and the approximation circuit that selects the trigonometric function of the first floating-point number among the first, fifth, and sixth floating-point numbers based on a control signal.

Example 3 is the circuitry of example 2, further comprising: a control circuit that receives the first floating-point number and generates the control signal such that the control signal directs the selection circuit to select the first floating-point number when the first floating-point number lies in a first interval, the fifth floating-point number when the first floating-point number lies in a second interval, and the sixth floating-point number when the first floating-point number lies in a third interval, wherein the first, second, and third intervals are disjoint.

Example 4 is the circuitry of example 2, wherein the third storage circuit stores additional predetermined floating-point numbers of additional output values of the trigonometric function for a predetermined input interval and wherein a read address that is based on the first floating-point number retrieves the sixth floating-point number from the third storage circuit during a read access operation when the first floating-point number lies in the predetermined input interval.

Example 5 is the circuitry of example 2, further comprising: a mapping circuit that receives a seventh floating-point number and maps the seventh floating-point number to the interval between 0 and $\pi/2$ to generate the first floating-point number.

Example 6 is the circuitry of example 5, further comprising: a restoration circuit coupled to the mapping circuit and the selection circuit that restores the trigonometric function of the first floating-point number from the selection circuit to the interval between −π/2 and π/2 based on the seventh floating-point number.

Example 7 is the circuitry of any one of examples 1 to 6, wherein the first floating-point number has a mantissa and an exponent, and wherein the extraction circuit further comprises: a right shift circuit that shift a first number of bits of the mantissa by a second number of bits to the right to generate the first and second fixed-point numbers, wherein the second number of bits is based on the exponent.

Example 8 is the circuitry of any one of examples 1 to 6, wherein the first floating-point number has a mantissa and an exponent, and wherein the extraction circuit further comprises: a third storage circuit that provides a mask based on a first number of bits of the exponent; a mask application circuit that applies the mask from the third storage circuit to the mantissa to generate an intermediate floating-point number; and a floating-point subtractor that subtracts an additional predetermined floating-point number from the intermediate floating-point number to generate the second floating-point number.

Example 9 is the circuitry of any one of examples 1 to 8, wherein the arithmetic circuitry further comprises: a first floating-point arithmetic circuit that generates a numerator of the fifth floating-point number based on a floating-point addition of the second, third, and fourth floating-point numbers; and a second floating-point arithmetic circuit that generates a denominator of the fifth floating-point number based on a floating-point addition of the second and third floating-point numbers, a floating-point multiplication with the fourth floating-point number, and a floating-point subtraction from one.

Example 10 is the circuitry of example 9, wherein the arithmetic circuitry further comprises: a mantissa inversion circuit coupled to the second floating-point arithmetic circuit that generates a reciprocal of the denominator of the fifth floating-point number; and a floating-point multiplier circuit that multiplies the numerator of the fifth floating-point number from the first floating-point arithmetic circuit with the reciprocal of the denominator of the fifth floating-point number from the mantissa inversion circuit to generate the fifth floating-point number.

Example 11 is the circuitry of example 10, wherein the mantissa inversion circuit performs a piecewise polynomial approximation.

Example 12 is the circuitry of example 10, wherein the mantissa inversion circuit performs a Newton-Raphson iteration.

Example 13 is the circuitry of any one of examples 10 to 12, wherein the mantissa inversion circuit further comprises: a left shift circuit that shifts the mantissa of the reciprocal of the denominator one bit position to the left if the most significant bit before a shift operation is zero.

Example 14 is the circuitry of any one of examples 10 to 13, wherein the mantissa inversion circuit further comprises: a barrel shifter that shifts a bias of a floating-point exponent one bit to the left to generate twice the bias.

Example 15 is the circuitry of example 14, wherein the barrel shifter replaces the second least significant bit and the least significant bit of twice the bias by the most significant bit of the reciprocal of the denominator and the inverse of the reciprocal of the denominator, respectively, to generate a normalization exponent.

Example 16 is the circuitry of example 15, further comprising: a fixed-point subtractor that subtracts the exponent of the denominator from the normalization exponent to generate the exponent of the reciprocal of the denominator.

Example 17 is the circuitry of any one of examples 9 to 16, wherein the second floating-point arithmetic circuit further comprises: a floating-point adder circuit that adds the second and third floating-point numbers to generate a first sum.

Example 18 is the circuitry of example 17, wherein the second floating-point arithmetic circuit further comprises: an additional floating-point multiplier circuit that multiplies the first sum with the fourth floating-point number to generate a product.

Example 19 is the circuitry of example 18, wherein the second floating-point arithmetic circuit further comprises: a floating-point subtractor circuit that subtracts the product from one to generate the denominator of the fifth floating-point number.

Example 20 is a method for computing a trigonometric function of a first floating-point number, comprising: receiving the first floating-point number at an input port of an approximation circuit; using an extraction circuit in the approximation circuit to generate first and second fixed-point numbers and a second floating-point number based on the first floating-point number; retrieving from first and second storage circuits in the approximation circuit, that both store predetermined floating-point numbers of output values of the trigonometric function, third and fourth floating-point numbers of the predetermined floating-point numbers based on the first and second fixed-point numbers, respectively; and using arithmetic circuitry in the approximation circuit to perform floating-point arithmetic operations on the second, third, and fourth floating-point numbers to generate a fifth floating-point number as an approximation of the trigonometric function of the first floating-point number.

Example 21 is the method of example 20, further comprising: retrieving from a third storage circuit, that stores additional predetermined floating-point numbers of additional output values of the trigonometric function, a sixth floating-point number of the additional predetermined floating-point numbers based on the first floating-point number; using a control circuit that receives the first floating-point number to generate a control signal such that the control signal has a first value when the first floating-point number lies in a first interval, a second value when the first floating-point number lies in a second interval, and a third value when the first floating-point number lies in a third interval, wherein the first, second, and third intervals are disjoint; and using the control signal to direct a selection circuit coupled to the third storage circuit and the approximation circuit to selects the trigonometric function of the first floating-point number among the first, fifth, and sixth floating-point numbers.

Example 22 is the method of example 21, wherein retrieving the sixth floating-point number further comprises: generating a read address that is based on the first floating-point number; and using the read address to perform a read access operation of the third storage circuit when the first floating-point number lies in a predetermined input interval.

Example 23 is the method of example 20, wherein the first floating-point number has a mantissa and an exponent, and wherein using the extraction circuit in the approximation circuit to generate the first and second fixed-point numbers and the second floating-point number further comprises: using a right shift circuit to shift a first number of bits of the mantissa by a second number of bits to the right to generate the first and second fixed-point numbers, wherein the second number of bits is based on the exponent; retrieving a mask from a third storage circuit using a third number of bits of the exponent; applying the mask from the third storage circuit to the mantissa to generate a sixth floating-point number; and subtracting an additional predetermined floating-point number from the sixth floating-point number to generate the second floating-point number.

Example 24 is the method of example 23, further comprising: using arithmetic circuitry in the approximation circuit to generate the fifth floating-point number by performing floating-point arithmetic operations of the second, third, and fourth floating-point numbers.

Example 25 is the method of example 24, wherein performing floating-point arithmetic operations of the second, third, and fourth floating-point numbers further comprises: generating a numerator of the fifth floating-point number based on a floating-point addition of the second, third, and fourth floating-point numbers; generating a denominator of the fifth floating-point number based on a floating-point addition of the second and third floating-point numbers, a floating-point multiplication with the fourth floating-point number, and a floating-point subtraction from one; generating a reciprocal of the denominator of the fifth floating-point number; and multiplying the numerator of the fifth floating-point number with the reciprocal of the denominator of the fifth floating-point number to generate the fifth floating-point number.

Example 26 is a non-transitory machine-readable storage medium encoded with instructions for configuring circuitry to compute a trigonometric function of a first floating-point number, wherein the circuitry comprises a first storage circuit, an approximation circuit, and a selection circuit coupled to the storage circuit and the approximation circuit, and wherein the approximation circuit comprises an extraction circuit, second and third storage circuits, and arithmetic circuitry, the instructions comprising: instructions to configure the extraction circuit to generate first and second fixed-point numbers and a second floating-point number based on the first floating-point number; instructions to configure the second and third storage circuits, that both store predetermined floating-point numbers of output values of the trigonometric function, to output third and fourth floating-point numbers of the predetermined floating-point numbers based on the first and second fixed-point numbers, respectively; and instructions to configure the arithmetic circuitry to perform floating-point arithmetic operations on the second, third, and fourth floating-point numbers to generate a fifth floating-point number as an approximation of the trigonometric function of the first floating-point number.

Example 27 is the non-transitory machine-readable storage medium of example 26, further comprising: instructions to configure the first storage circuit that stores additional predetermined floating-point numbers of additional output values of the trigonometric function to output a sixth floating-point number of the additional predetermined floating-point numbers based on the first floating-point number; and instructions to configure the selection circuit to select the trigonometric function of the first floating-point number among the first, fifth, and sixth floating-point numbers based on a control signal.

Example 28 is the non-transitory machine-readable storage medium of example 26, further comprising: instructions to generate the instructions of example 16.

Example 29 is the non-transitory machine-readable storage medium of example 26, wherein the arithmetic circuitry comprises first and second floating-point arithmetic circuits, further comprising: instructions to configure the first floating-point arithmetic circuit to generates a numerator of the fifth floating-point number based on a floating-point addition of the second, third, and fourth floating-point numbers; and instruction to configure the second floating-point arithmetic circuit to generate a denominator of the fifth floating-point number based on a floating-point addition of the second and third floating-point numbers, a floating-point multiplication with the fourth floating-point number, and a floating-point subtraction from one.

Example 30 is the non-transitory machine-readable storage medium of example 29, wherein the arithmetic circuitry further comprises a mantissa inversion circuit and a floating-point multiplier circuit, further comprising: instructions to configure the mantissa inversion circuit to generate a reciprocal of the denominator of the fifth floating-point number; and instructions to configure the floating-point multiplier circuit to multiply the numerator of the fifth floating-point number from the first floating-point arithmetic circuit with the reciprocal of the denominator of the fifth floating-point number from the mantissa inversion to generate the fifth floating-point number.

Example 31 is an integrated circuit for computing a trigonometric function of a first floating-point number, comprising: a storage circuit that stores predetermined floating-point numbers of output values of the trigonometric function and outputs a second floating-point number of the predetermined floating-point numbers based on the first floating-point number; an approximation circuit that approximates the trigonometric function of the first floating-point number to generate a third floating-point number; and a selection circuit coupled to the storage circuit and the approximation circuit that selects the trigonometric function of the first floating-point number among the first, second, and third floating-point numbers based on a control signal.

Example 32 is the integrated circuit of example 31, further comprising: a control circuit that receives the first floating-point number and generates the control signal such that the control signal directs the selection circuit to select the first floating-point number when the first floating-point number lies in a first interval, the second floating-point number when the first floating-point number lies in a second interval, and the third floating-point number when the first floating-point number lies in a third interval, wherein the first, second, and third intervals are disjoint.

Example 33 is the integrated circuit of example 31, wherein the storage circuit stores the predetermined floating-point numbers of output values of the trigonometric function for a predetermined input interval and wherein a read address that is based on the first floating-point number retrieves the second floating-point number from the storage circuit during a read access operation when the first floating-point number lies in the predetermined input interval.

Example 34 is the integrated circuit of any one of examples 31 to 33, wherein the approximation circuit further comprises: an extraction circuit that receives the first floating-point number and generates first and second fixed-point numbers and a fourth floating-point number based on the first floating-point number.

Example 35 is the integrated circuit of example 34, wherein the first floating-point number has a mantissa and an exponent, and wherein the extraction circuit further comprises: a right shift circuit that shift a first number of bits of the mantissa by a second number of bits to the right to generate the first and second fixed-point numbers, wherein the second number of bits is based on the exponent.

Example 36 is the integrated circuit of example 34, wherein the first floating-point number has a mantissa and an exponent, and wherein the extraction circuit further comprises: an additional storage circuit that provides a mask based on a first number of bits of the exponent; a mask application circuit that applies the mask from the additional storage circuit to a second number of bits of the mantissa to generate an intermediate floating-point number; and a floating-point subtractor that subtracts an additional predetermined floating-point number from the intermediate floating-point number to generate the fourth floating-point number.

Example 37 is the integrated circuit of example 34, wherein the approximation circuit further comprises: a first additional storage circuit that stores first additional predetermined floating-point numbers of output values of the trigonometric function and outputs a fifth floating-point number of the first additional predetermined floating-point numbers based on the first fixed-point number; and a second additional storage circuit that stores second additional predetermined floating-point numbers of the output values of the trigonometric function and outputs a sixth floating-point number of the second additional predetermined floating-point numbers based on the second fixed-point number.

Example 38 is the integrated circuit of example 37, wherein the approximation circuit further comprises: arithmetic circuitry that receives the fourth, fifth, and sixth floating-point numbers and performs floating-point arithmetic operations on the fourth, fifth, and sixth floating-point numbers to generate the third floating-point number.

Example 39 is the integrated circuit of example 38, wherein the arithmetic circuitry further comprises: a first floating-point arithmetic circuit that generates a numerator of the third floating-point number based on a floating-point addition of the fourth, fifth, and sixth floating-point numbers; a second floating-point arithmetic circuit that generates a denominator of the third floating-point number based on a floating-point addition of the fourth and fifth floating-point numbers, a floating-point multiplication with the sixth floating-point number, and a floating-point subtraction from one; a divider circuit that generates an inverse of the denominator of the third floating-point number; and a floating-point multiplier circuit that multiplies the numerator of the third floating-point number from the first floating-point arithmetic circuit with the inverse of the denominator of the third floating-point number from the divider to generate the third floating-point number.

Example 40 is the integrated circuit of example 31, wherein the storage circuit is selected from the group consisting of a first-in first-out circuit, a last-in first-out circuit, a serial-in parallel-out shift register circuit, a parallel-in serial-out shift register circuit, a random-access memory circuit, a read-only memory circuit, a content-addressable memory circuit, and a register file.

Example 41 is the integrated circuit of any one of examples 31 to 40, further comprising: a pin; and a serial receiver circuit that receives a serialized data signal from the pin and parallelizes at least a portion of the serialized data signal.

Example 42 is the integrated circuit of any one of examples 31 to 40, further comprising: a pin; and a serial transmitter circuit that receives a parallel data signal from the selection circuit, serializes the parallel data signal to generate a serialized data signal, and transmits the serialized data signal to the pin.

Example 43 is the integrated circuit of any one of examples 31 to 40, further comprising: a programmable logic region coupled to the selection circuit.

Example 44 is the integrated circuit of example 43, wherein the programmable logic region further comprises: a plurality of look-up table circuits.

Example 45 is the integrated circuit of any one of examples 31 to 40, further comprising: interconnection resources that are coupled to an output port of the selection circuit.

Example 46 is the integrated circuit of example 45, wherein the interconnection resources further comprise: horizontal interconnection resources; and vertical interconnection resources.

Example 47 is the integrated circuit of example 45, wherein the interconnection resources further comprise: a plurality of conductive lines.

Example 48 is the integrated circuit of example 47, further comprising: a programmable connection between a first conductive line of the plurality of conductive lines and a second conductive line of the plurality of conductive lines.

Example 49 is the integrated circuit of any one of examples 31 to 40, wherein at least a portion of the approximation circuit is implemented in a specialized processing block.

The above described embodiments are presented for purposes of illustration and not of limitation.

What is claimed is:

1. Circuitry for computing a trigonometric function of a first floating-point number, comprising:
    an approximation circuit that receives the first floating-point number at an input port and comprises:
        an extraction circuit coupled to the input port that generates first and second fixed-point numbers and a second floating-point number based on the first floating-point number,
        first and second storage circuits coupled to the extraction circuit that both store predetermined floating-point numbers of output values of the trigonometric function and output third and fourth floating-point numbers of the predetermined floating-point numbers based on the first and second fixed-point numbers, respectively, and
        arithmetic circuitry coupled to the extraction circuit and the first and second storage circuits that performs floating-point arithmetic operations on the second, third, and fourth floating-point numbers to generate a fifth floating-point number as an approximation of the trigonometric function of the first floating-point number.

2. The circuitry of claim 1, further comprising:
    a third storage circuit that stores additional predetermined floating-point numbers of additional output values of the trigonometric function and outputs a sixth floating-point number of the additional predetermined floating-point numbers based on the first floating-point number; and
    a selection circuit coupled to the third storage circuit and the approximation circuit that selects the trigonometric function of the first floating-point number among the first, fifth, and sixth floating-point numbers based on a control signal.

3. The circuitry of claim 2, further comprising:
    a control circuit that receives the first floating-point number and generates the control signal such that the control signal directs the selection circuit to select the first floating-point number when the first floating-point number lies in a first interval, the fifth floating-point number when the first floating-point number lies in a second interval, and the sixth floating-point number when the first floating-point number lies in a third interval, wherein the first, second, and third intervals are disjoint.

4. The circuitry of claim 2, wherein the third storage circuit stores additional predetermined floating-point numbers of additional output values of the trigonometric function for a predetermined input interval and wherein a read address that is based on the first floating-point number retrieves the sixth floating-point number from the third storage circuit during a read access operation when the first floating-point number lies in the predetermined input interval.

5. The circuitry of claim 1, wherein the first floating-point number has a mantissa and an exponent, and wherein the extraction circuit further comprises:
a right shift circuit that shift a first number of bits of the mantissa by a second number of bits to the right to generate the first and second fixed-point numbers, wherein the second number of bits is based on the exponent.

6. The circuitry of claim 1, wherein the first floating-point number has a mantissa and an exponent, and wherein the extraction circuit further comprises:
a third storage circuit that provides a mask based on a first number of bits of the exponent;
a mask application circuit that applies the mask from the third storage circuit to the mantissa to generate a sixth floating-point number; and
a floating-point subtractor that subtracts an additional predetermined floating-point number from the sixth floating-point number to generate the second floating-point number.

7. The circuitry of claim 1, wherein the arithmetic circuitry further comprises:
a first floating-point arithmetic circuit that generates a numerator of the fifth floating-point number based on a floating-point addition of the second, third, and fourth floating-point numbers; and
a second floating-point arithmetic circuit that generates a denominator of the fifth floating-point number based on a floating-point addition of the second and third floating-point numbers, a floating-point multiplication with the fourth floating-point number, and a floating-point subtraction from one.

8. The circuitry of claim 7, wherein the arithmetic circuitry further comprises:
a mantissa inversion circuit coupled to the second floating-point arithmetic circuit that generates a reciprocal of the denominator of the fifth floating-point number; and
a floating-point multiplier circuit that multiplies the numerator of the fifth floating-point number from the first floating-point arithmetic circuit with the reciprocal of the denominator of the fifth floating-point number from the mantissa inversion circuit to generate the fifth floating-point number.

9. The circuitry of claim 8, wherein the mantissa inversion circuit performs a piecewise polynomial approximation.

10. A method for computing a trigonometric function of a first floating-point number in an integrated circuit, comprising:
receiving the first floating-point number at an input port of an approximation circuit;
using an extraction circuit in the approximation circuit to generate first and second fixed-point numbers and a second floating-point number based on the first floating-point number;
retrieving from first and second storage circuits in the approximation circuit, that both store predetermined floating-point numbers of output values of the trigonometric function, third and fourth floating-point numbers of the predetermined floating-point numbers based on the first and second fixed-point numbers, respectively; and
using arithmetic circuitry in the approximation circuit to perform floating-point arithmetic operations on the second, third, and fourth floating-point numbers to generate a fifth floating-point number as an approximation of the trigonometric function of the first floating-point number.

11. The method of claim 10, further comprising:
retrieving from a third storage circuit, that stores additional predetermined floating-point numbers of additional output values of the trigonometric function, a sixth floating-point number of the additional predetermined floating-point numbers based on the first floating-point number;
using a control circuit that receives the first floating-point number to generate a control signal such that the control signal has a first value when the first floating-point number lies in a first interval, a second value when the first floating-point number lies in a second interval, and a third value when the first floating-point number lies in a third interval, wherein the first, second, and third intervals are disjoint; and
using the control signal to direct a selection circuit coupled to the third storage circuit and the approximation circuit to selects the trigonometric function of the first floating-point number among the first, fifth, and sixth floating-point numbers.

12. The method of claim 11, wherein retrieving the sixth floating-point number further comprises:
generating a read address that is based on the first floating-point number; and
using the read address to perform a read access operation of the third storage circuit when the first floating-point number lies in a predetermined input interval.

13. The method of claim 10, wherein the first floating-point number has a mantissa and an exponent, and wherein using the extraction circuit in the approximation circuit to generate the first and second fixed-point numbers and the second floating-point number further comprises:
using a right shift circuit to shift a first number of bits of the mantissa by a second number of bits to the right to generate the first and second fixed-point numbers, wherein the second number of bits is based on the exponent;
retrieving a mask from a third storage circuit using a third number of bits of the exponent;
applying the mask from the third storage circuit to the mantissa to generate a sixth floating-point number; and
subtracting an additional predetermined floating-point number from the sixth floating-point number to generate the second floating-point number.

14. The method of claim 13, further comprising:
using arithmetic circuitry in the approximation circuit to generate the fifth floating-point number by performing floating-point arithmetic operations of the second, third, and fourth floating-point numbers.

15. The method of claim 14, wherein performing floating-point arithmetic operations of the second, third, and fourth floating-point numbers further comprises:
generating a numerator of the fifth floating-point number based on a floating-point addition of the second, third, and fourth floating-point numbers;
generating a denominator of the fifth floating-point number based on a floating-point addition of the second and third floating-point numbers, a floating-point multiplication with the fourth floating-point number, and a floating-point subtraction from one;
generating a reciprocal of the denominator of the fifth floating-point number; and
multiplying the numerator of the fifth floating-point number with the reciprocal of the denominator of the fifth floating-point number to generate the fifth floating-point number.

16. A non-transitory machine-readable storage medium encoded with instructions for configuring circuitry to compute a trigonometric function of a first floating-point number, wherein the circuitry comprises a first storage circuit, an approximation circuit, and a selection circuit coupled to the storage circuit and the approximation circuit, and wherein the approximation circuit comprises an extraction circuit, second and third storage circuits, and arithmetic circuitry, the instructions comprising:
    instructions to configure the extraction circuit to generate first and second fixed-point numbers and a second floating-point number based on the first floating-point number;
    instructions to configure the second and third storage circuits, that both store predetermined floating-point numbers of output values of the trigonometric function, to output third and fourth floating-point numbers of the predetermined floating-point numbers based on the first and second fixed-point numbers, respectively; and
    instructions to configure the arithmetic circuitry to perform floating-point arithmetic operations on the second, third, and fourth floating-point numbers to generate a fifth floating-point number as an approximation of the trigonometric function of the first floating-point number.

17. The non-transitory machine-readable storage medium of claim 16, further comprising:
    instructions to configure the first storage circuit that stores additional predetermined floating-point numbers of additional output values of the trigonometric function to output a sixth floating-point number of the additional predetermined floating-point numbers based on the first floating-point number; and
    instructions to configure the selection circuit to select the trigonometric function of the first floating-point number among the first, fifth, and sixth floating-point numbers based on a control signal.

18. The non-transitory machine-readable storage medium of claim 16, further comprising:
    instructions to generate the instructions of claim 16.

19. The non-transitory machine-readable storage medium of claim 16, wherein the arithmetic circuitry comprises first and second floating-point arithmetic circuits, further comprising:
    instructions to configure the first floating-point arithmetic circuit to generates a numerator of the fifth floating-point number based on a floating-point addition of the second, third, and fourth floating-point numbers; and
    instruction to configure the second floating-point arithmetic circuit to generate a denominator of the fifth floating-point number based on a floating-point addition of the second and third floating-point numbers, a floating-point multiplication with the fourth floating-point number, and a floating-point subtraction from one.

20. The non-transitory machine-readable storage medium of claim 19, wherein the arithmetic circuitry further comprises a mantissa inversion circuit and a floating-point multiplier circuit, further comprising:
    instructions to configure the mantissa inversion circuit to generate a reciprocal of the denominator of the fifth floating-point number; and
    instructions to configure the floating-point multiplier circuit to multiply the numerator of the fifth floating-point number from the first floating-point arithmetic circuit with the reciprocal of the denominator of the fifth floating-point number from the mantissa inversion to generate the fifth floating-point number.

* * * * *